United States Patent
Hiwatashi et al.

[11] Patent Number: 5,816,669
[45] Date of Patent: Oct. 6, 1998

[54] VEHICLE MOTION CONTROL SYSTEM

[75] Inventors: Yutaka Hiwatashi, Isesaki; Koji Matsuno, Kasakake-Machi; Akira Takahashi; Munenori Matsuura, both of Ota, all of Japan

[73] Assignee: Fuji Jukogyo Kabushiki Kaisha, Tokyo-to, Japan

[21] Appl. No.: 733,582

[22] Filed: Oct. 18, 1996

[30] Foreign Application Priority Data

Oct. 19, 1995 [JP] Japan ................................. 7-271304

[51] Int. Cl.⁶ ................................................. B60T 8/32
[52] U.S. Cl. ........................... 303/140; 303/122; 303/146
[58] Field of Search ................................. 303/146, 147, 303/148, 140, 122, 122.04, 122.05; 364/426.016, 424.051; 180/197; 188/181 C; 701/41, 42, 72, 43, 76, 92, 48

[56] References Cited

U.S. PATENT DOCUMENTS 5,373,444 12/1994 Takahashi ................................. 701/43
5,457,632 10/1995 Tagawa et al. ............................ 701/43
5,576,959 11/1996 Hrovat et al. ............................ 303/146

*Primary Examiner*—Douglas C. Butler
*Attorney, Agent, or Firm*—Beveridge, DeGrandi, Weilacher & Young, LLP

[57] ABSTRACT

In a vehicle motion control system, a target rear-wheel steering-angle calculating section calculates a target rear-wheel steering angle, a rear-wheel steering-quantity setting section sets a rear-wheel steering quantity, and a rear-wheel steering signal output section outputs a rear-wheel steering quantity to a motor driving section to perform a steering angle control. In addition, a front-and-rear wheel steering response-parameter calculating section calculates a response parameter, and a front-and-rear wheel steering target yaw-rate calculating section calculates a target yaw rate. A yaw-rate difference calculating section calculates a yaw-rate difference, a target braking-force calculating section calculates a target braking force, and a braked-wheel discriminating section selects a wheel to be braked. When an output discriminating section determines that there is within a controllable region, a braking signal output section outputs a signal to a brake driving section so as to add the target braking force to the selected wheel.

3 Claims, 12 Drawing Sheets

VEHICLE MOTION CONTROL SYSTEM

BACKGROUND OF THE INVENTION

The present invention relates to a vehicle motion control system which improves the stability of an automotive vehicle during the cornering of the vehicle and so forth by controlling a steering angle and braking force.

In recent years, various braking force control systems have been proposed for improving the stability of an automotive vehicle by applying braking force to a proper wheel thereof during the cornering of the vehicle on the basis of the force applied to the vehicle during the cornering and so forth.

For example, Japanese Patent Laid-Open No. 2-70561 discloses a braking force control system which controls braking force on the basis of rotational motion around the vertical axis passing through the center of gravity of an automotive vehicle, i.e. on the basis of a yaw rate which is an angular velocity of yawing. In this technique, a target yaw rate is compared with an actual yaw rate, and then, it is determined as to whether the vehicle running condition is an under-steer tendency or an over-steer tendency with respect to the target yaw rate. In order to cause the actual yaw rate to coincide with the target yaw rate, braking force is applied to inside wheels when it is the under-steer tendency, and braking force is applied to outside wheels when it is the over-steer tendency, so that the running stability of the vehicle is improved.

In addition, Japanese Patent Laid-Open No. 5-294249 discloses a vehicle motion control system which further improves the stability of an automotive vehicle by combining the braking force control with a steering angle control (4WS control) for steering front and rear wheels. In the braking force control as set forth above, the target yaw rate, which is derived on the basis of a response parameter and a front-wheel steering angle of the vehicle, is an important control parameter which must be accurately derived.

For that reason, in a case where the braking force control is combined with the 4WS control, if the target yaw rate is derived by a vehicle model for a typical front-wheel steering type vehicle (2WS vehicle), errors occur, so that it is difficult to obtain a target performance. That is, the occurring conditions of a yaw rate with respect to a steering-wheel angle are different between a 4WS vehicle and a 2WS vehicle. Therefore, if the aforementioned braking force control is performed by the vehicle model for the 2WS vehicle, the derived target yaw rate is largish in a relatively low frequency region of the steering, so that it is determined that the vehicle has a drift-out tendency in comparison with the actual condition, so as to perform the braking force control toward the spin. In a relatively high frequency region of the steering, the derived target yaw rate is smallish, so that it is determined that the vehicle has a spin tendency in comparison with the actual condition, so as to start the braking force control toward the drift-out.

On the other hand, in the 4WS control, when abnormality occurs in the sensor, the control section, the steering section and so forth, the rear-wheel steering angle is set to be return to the neutral position to be fixed thereto or to be fixed to the failure position, so as to prevent the setting of the rear-wheel steering angle from being interrupted. In such a case, if the braking force control continues by the 4WS vehicle model, error occurs, so that it is difficult to obtain a target performance.

SUMMARY OF THE INVENTION

It is therefore a primary object of the present invention to eliminate the aforementioned problems and to provide a vehicle motion control system which can accurately derive a response parameter and a target yaw rate, which are used for a braking force control combined with a 4WS control, to obtain target performance and to perform a stable control.

It is a secondary object of the present invention to provide a vehicle motion control system which can obtain target performance by combining a braking force control and a 4WS control, which can perform a stable control, and in which the braking force control can be effectively performed in a stable state even if abnormality occurs in the 4WS control.

In order to accomplish the aforementioned and other objects, according to one aspect of the present invention, a vehicle motion control system comprises: vehicle-speed detecting means for detecting a running speed of a vehicle; front-wheel steering-angle detecting means for detecting a steering angle of a front wheel of the vehicle; rear-wheel steering-angle detecting means for detecting a steering angle of a rear wheel of the vehicle; actual yaw-rate detecting means for detecting an actual yaw rate of the vehicle; target rear-wheel steering-angle calculating means for calculating a target steering angle of the rear wheel; rear-wheel steering-quantity setting means for setting the quantity of steering of the rear wheel on the basis of the target steering angle of the rear wheel and an actual steering angle of the rear wheel; rear-wheel steering signal output means for outputting the quantity of steering of the rear wheel to a rear-wheel steering section; front-and-rear wheel steering response-parameter calculating means for calculating a front-and-rear wheel steering response parameter by a front-and-rear wheel steering vehicle model on the basis of the running speed of the vehicle; front-and-rear wheel steering target yaw-rate calculating means for calculating a front-and-rear wheel steering target yaw rate on the basis of the front-and-rear wheel steering response parameter and the steering angle of the front wheel; yaw-rate difference calculating means for calculating a yaw-rate difference by subtracting the front-and-rear wheel steering target yaw rate from the actual yaw rate; target braking-force calculating means for calculating a target braking force of the vehicle on the basis of a condition of vehicle motion, the front-and-rear steering response parameter and the yaw-rate difference; braked-wheel discriminating means for selecting a rear-inside wheel, as a braked-wheel to be braked, when the actual yaw rate has a different sign from that of the yaw-rate difference, and for selecting a front-outside wheel as the braked-wheel when the actual yaw rate has the same sign as that of the yaw-rate difference; output discriminating means for discriminating as to whether there is within a braking controllable region; and braking-signal output means for outputting a signal to a brake driving section so as to add the target braking force calculated by the target braking-force calculating means, to the braked wheel selected by the braked-wheel discriminating means, when the output discriminating means determines that there is within the braking controllable region.

In the vehicle motion control system as set forth above, the vehicle-speed detecting means detects the vehicle speed, the rear-wheel steering-angle detecting means detects the steering angle of the rear wheel, and the actual yaw-rate detecting means detects the actual yaw rate of the vehicle. The target rear-wheel steering-angle calculating means calculates the target steering angle of the rear wheel, the rear-wheel steering-quantity setting means sets the steering quantity of the rear wheel on the basis of the target steering angle of the rear wheel and the actual steering angle of the rear wheel, and the rear-wheel steering signal output means outputs the steering quantity of the rear wheel to the rear-wheel steering section to perform the steering-angle control. In addition, the front-and-rear wheel steering response-parameter calculating means calculates the response parameter by the front-and-rear wheel steering vehicle model, the front-and-rear wheel steering target yaw-rate calculating means calculates the target yaw rate on the basis of the front-and-rear wheel steering response parameter and the steering angle of the front wheel, the yaw-rate difference calculating means calculates the yaw-rate difference by subtracting the front-and-rear wheel steering target yaw rate from the actual yaw rate, and the target braking-force calculating means calculates the target braking force of the vehicle on the basis of the condition of vehicle motion, the front-and-rear steering response parameter and the yaw-rate difference. Moreover, the braked-wheel discriminating means selects the rear-inside wheel as the braked-wheel when the sign of the actual yaw rate is different from that of the yaw-rate difference, and selects the front-outside wheel as the braked-wheel when the sign of the actual yaw rate is the same as that of the yaw-rate difference. In addition, the output discriminating means discriminates as to whether there is within the braking controllable region, and the braking-signal output means outputs the signal to the brake driving section so as to add the target braking force calculated by the target braking-force calculating means, to the braked wheel selected by the braked-wheel discriminating means, when the output discriminating means determines that there is within the braking controllable region.

According to another aspect of the present invention, a vehicle motion control system comprises: vehicle-speed detecting means for detecting a running speed of a vehicle; front-wheel steering-angle detecting means for detecting a steering angle of a front wheel of the vehicle; rear-wheel steering-angle detecting means for detecting a steering angle of a rear wheel of the vehicle; actual yaw-rate detecting means for detecting an actual yaw rate of the vehicle; target rear-wheel steering-angle calculating means for calculating a target steering angle of the rear wheel; rear-wheel steering-quantity setting means for setting the quantity of steering of the rear wheel on the basis of the target steering angle of the rear wheel and an actual steering angle of the rear wheel; rear-wheel steering signal output means for outputting the quantity of steering of the rear wheel to a rear-wheel steering section; front-and-rear wheel steering response-parameter calculating means for calculating a front-and-rear wheel steering response parameter by a front-and-rear wheel steering vehicle model on the basis of the running speed of the vehicle; front-wheel steering response-parameter calculating means for calculating a front-wheel steering response parameter by a front-wheel steering vehicle model on the basis of the running speed of the vehicle; front-and-rear wheel steering target yaw-rate calculating means for calculating a front-and-rear wheel steering target yaw rate on the basis of the front-and-rear wheel steering response parameter and the steering angle of the front wheel; front-wheel steering target yaw-rate calculating means for calculating a front-wheel steering target yaw-rate on the basis of the front-wheel steering response parameter and the steering angle of the front wheel; steering-angle control failure diagnosing means for detecting abnormality in a steering angle control; steering characteristic switching means for outputting the front-and-rear wheel steering response parameter as a response parameter and the front-and-rear wheel target yaw rate as a target yaw rate in a usual condition, and for outputting the front-wheel steering response parameter as the response parameter and the front wheel target yaw rate as the target yaw rate when the steering-angle control failure diagnosing means detects abnormality in the steering angle control; yaw-rate difference calculating means for calculating a yaw-rate difference by subtracting the target yaw rate from the actual yaw rate; target braking-force calculating means for calculating a target braking force of the vehicle on the basis of a condition of vehicle motion, the response parameter and the yaw-rate difference; braked-wheel discriminating means for selecting a rear-inside wheel, as a braked-wheel to be braked, when the actual yaw rate has a different sign from that of the yaw-rate difference, and for selecting a front-outside wheel as the braked-wheel when the actual yaw rate has the same sign as that of the yaw-rate difference; output discriminating means for discriminating as to whether there is within a braking controllable region; and braking-signal output means for outputting a signal to a brake driving section so as to add the target braking force calculated by the target braking-force calculating means, to the braked wheel selected by the braked-wheel discriminating means, when the output discriminating means determines that there is within the braking controllable region.

In the vehicle motion control system as set forth above, the vehicle-speed detecting means detects the running speed of the vehicle, the front-wheel steering-angle detecting means detects the steering angle of the front wheel of the vehicle, the rear-wheel steering-angle detecting means detects the steering angle of the rear wheel of the vehicle, and the actual yaw-rate detecting means detects the actual yaw rate of the vehicle. The target rear-wheel steering-angle calculating means calculates target steering angle of the rear wheel, the rear-wheel steering-quantity setting means sets the steering quantity of the rear wheel on the basis of the target steering angle of the rear wheel and the actual steering angle of the rear wheel, and the rear-wheel steering signal output means outputs the steering quantity of the rear wheel to the rear-wheel steering section to perform the steering angle control. In addition, the steering-angle control failure diagnosing means detects abnormality in the steering angle control. Moreover, the front-and-rear wheel steering response-parameter calculating means calculates the front-and-rear wheel steering response parameter by the front-and-rear wheel steering vehicle model on the basis of the running speed of the vehicle, the front-wheel steering response-parameter calculating means calculates the front-wheel steering response parameter by the front-wheel steering vehicle model on the basis of the running speed of the vehicle, the front-and-rear wheel steering target yaw-rate calculating means calculates the front-and-rear wheel steering target yaw rate on the basis of the front-and-rear wheel steering response parameter and the steering angle of the front wheel, and the front-wheel steering target yaw-rate calculating means calculates the front-wheel steering target yaw-rate on the basis of the front-wheel steering response parameter and the steering angle of the front wheel. In addition, the steering characteristic switching means outputs the front-and-rear wheel steering response parameter as the response parameter and the front-and-rear wheel target yaw rate as the target yaw rate in the usual condition, and outputs the front-wheel steering response paparameter as the response parameter and the front wheel target yaw rate as the target yaw rate when the steering-angle control failure diagnosing means detects abnormality in the steering angle control. Then, the yaw-rate difference calculating means calculates the yaw-rate difference by subtracting the target yaw rate from the actual yaw rate, and the target braking-force calculating means calculates the target braking force of the vehicle on the basis of the condition of vehicle motion, the response parameter and the yaw-rate difference. The braked-wheel discriminating means selects the rear-inside wheel as the braked-wheel when the sign of the actual yaw rate is different from that of the yaw-rate difference, and selects the front-outside wheel as the braked-wheel when the sign of the actual yaw rate has is same sign as that of the yaw-rate difference. The output discriminating means discriminates as to whether there is within the braking controllable region, and the braking-signal output means outputs the signal to the brake driving section so as to add the target braking force calculated by the target braking-force calculating means, to the braked wheel selected by the braked-wheel discriminating means, when the output discriminating means determines that there is within the braking controllable region.

The steering characteristic switching means may be designed to output the front-wheel steering response parameter as the response parameter and the front-wheel steering target yaw rate as the target yaw rate in a predetermined response characteristic, when the outputs of the response parameter and the target yaw rate are changed to those of the front-wheel steering response parameter and the front-wheel steering target yaw rate. By this response characteristic, it is possible to smoothly perform the transition of the outputs and to prevent the abrupt change.

According to the present invention, it is possible to accurately derive a response parameter and a target yaw rate, which are used for a braking force control combined with a 4WS control, to obtain target performance and to perform a stable control.

In addition, when abnormality is detected in the 4WS control, the response parameters and the target yaw rates derived by the 4WS vehicle model are switched to those derived by the 2WS vehicle model. Therefore, even if abnormality occurs in the 4WS control, it is possible to effectively operate a stable braking force control by the 2WS control.

DETAILED DESCRIPTION OF THE PREFERRED EMBODIMENTS

Referring now to the accompanying drawings, the preferred embodiments of a vehicle motion control system according to the present invention will be described in detail below.

Figure 2:
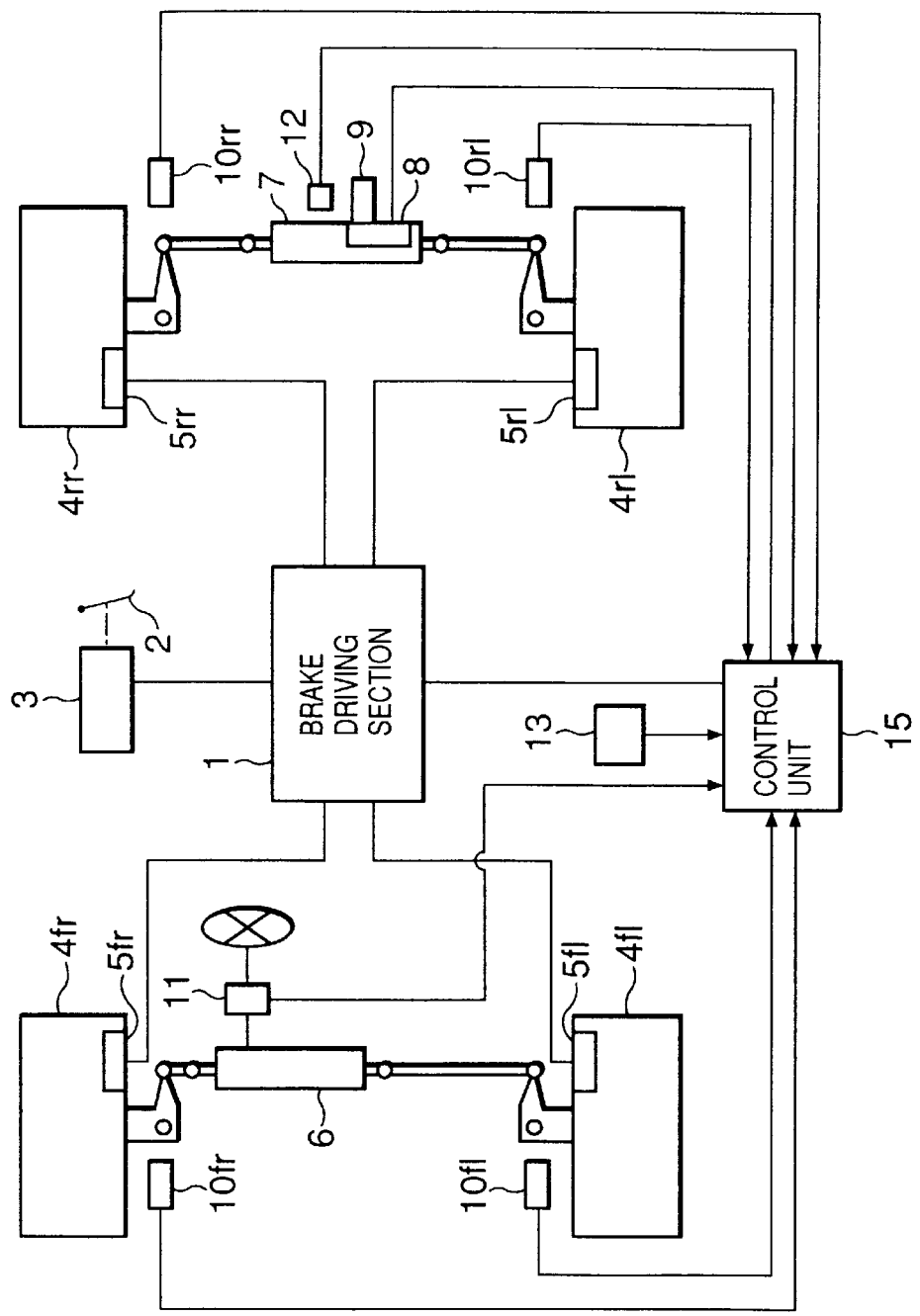
FIG. 2 is an explanatory drawing illustrating a schematic construction of the first preferred embodiment of a vehicle motion control system according to the present invention.

In FIG. 2, the reference number 1 denotes a brake driving section of an automotive vehicle. A master cylinder 3 is connected to the brake driving section. The master cylinder 3 is also connected to a brake pedal 2 which is operated by a driver. When the driver sets their foot on the brake pedal 2, braking pressure is introduced from the master cylinder 3 into each of wheel cylinders (a front-left wheel cylinder 5fl, a front-right wheel cylinder 5fr, a rear-left wheel cylinder 5rl and a rear-right wheel cylinder 5rr) for four wheels (a front-left wheel 4fl, a front-right wheel 4fr, a rear-left wheel 4rl and a rear-right wheel 4rr) through the brake driving section 1, so that braking force is applied to the four wheels.

The brake driving section 1 is a hydraulic unit which has a pressure source, a pressure reducing valve, a pressure intensifying valve. The brake driving section 1 can introduce braking pressure into the wheel cylinders 5fl, 5fr, 5rl and 5rr independently.

The reference number 6 denotes a front-wheel steering section of the vehicle, which has a power steering system. The front-wheel steering section 6 is connected to the front-left wheel 4fl and the front-right wheel 4fr via a link mechanism.

The reference number 7 denotes a rear-wheel steering section of the vehicle. The rear-wheel steering section 7 is provided with a rear-wheel driving motor 9 which is driven by a motor driving section 8. The power caused by the rear-wheel driving motor 9 is transmitted to the rear-left wheel 4rl and the rear-right wheel 4rr via a worm, a worm wheel and a link mechanism to steer the rear-left wheel 4rl and the rear-right wheel 4rr.

The wheel speeds $\omega 1$, $\omega 2$, $\omega 3$ and $\omega 4$ of the respective wheels 4fl, 4fr, 4rl and 4rr are detected by wheel speed sensors (a front-left wheel speed sensor 10fl, a front-right wheel speed sensor 10fr, a rear-left wheel speed sensor 10rl and a rear-right wheel speed sensor 10rr). In addition, the steering wheel portion of the vehicle is provided with a steering-wheel angle sensor 11 for detecting the turning angle of a steering wheel, and the rear-wheel steering section 7 is provided with a rear-wheel steering angle sensor 12 serving as rear-wheel steering angle detecting means for detecting a rear-wheel steering angle $\delta r$.

The reference number 15 denotes a control unit which comprises a microcomputer and its peripheral circuits. The wheel speed sensors 10fl, 10fr, 10rl and 10rr, the steering-wheel angle sensor 11, the rear-wheel steering angle sensor 12, and a yaw rate sensor 13 serving as actual yaw-rate detecting means for detecting an actual yaw rate $\gamma$ of the vehicle are connected to the control unit 15 for outputting a driving signal to the brake driving section 1 and the motor driving section 8 of the rear-wheel steering section 7.

Figure 8:
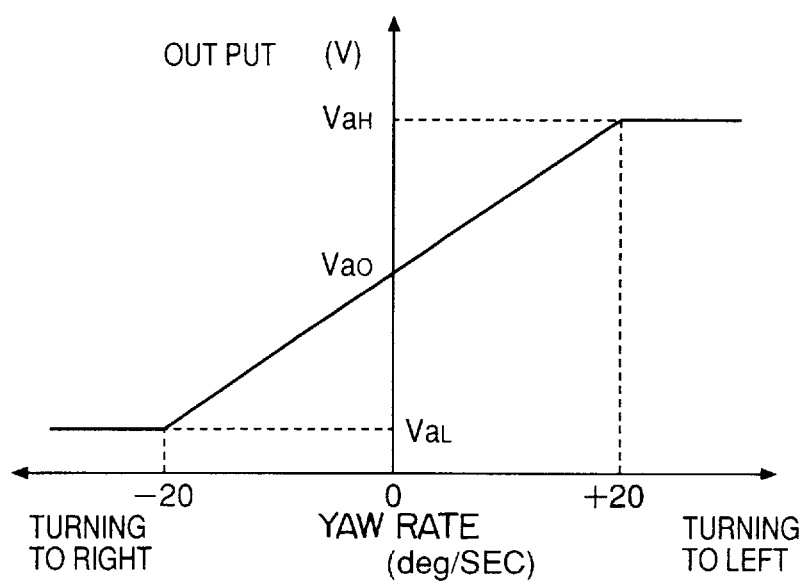
FIG. 8 is a graph showing the characteristic of a yaw-rate sensor in the first preferred embodiment according to the present invention.

For example, the yaw rate sensor 13 is formed by combining piezoelectric elements. As shown in FIG. 8, the yaw rate sensor 13 is designed to measure a yaw rate in the range of from −20 (clockwise) to +20 (counterclockwise) deg/s at an output voltage of VaL to VaH. The signal outputted from the yaw rate sensor 13 is inputted to the control unit 15, for example, through a low-pass filter of 7 Hz.

Figure 1:
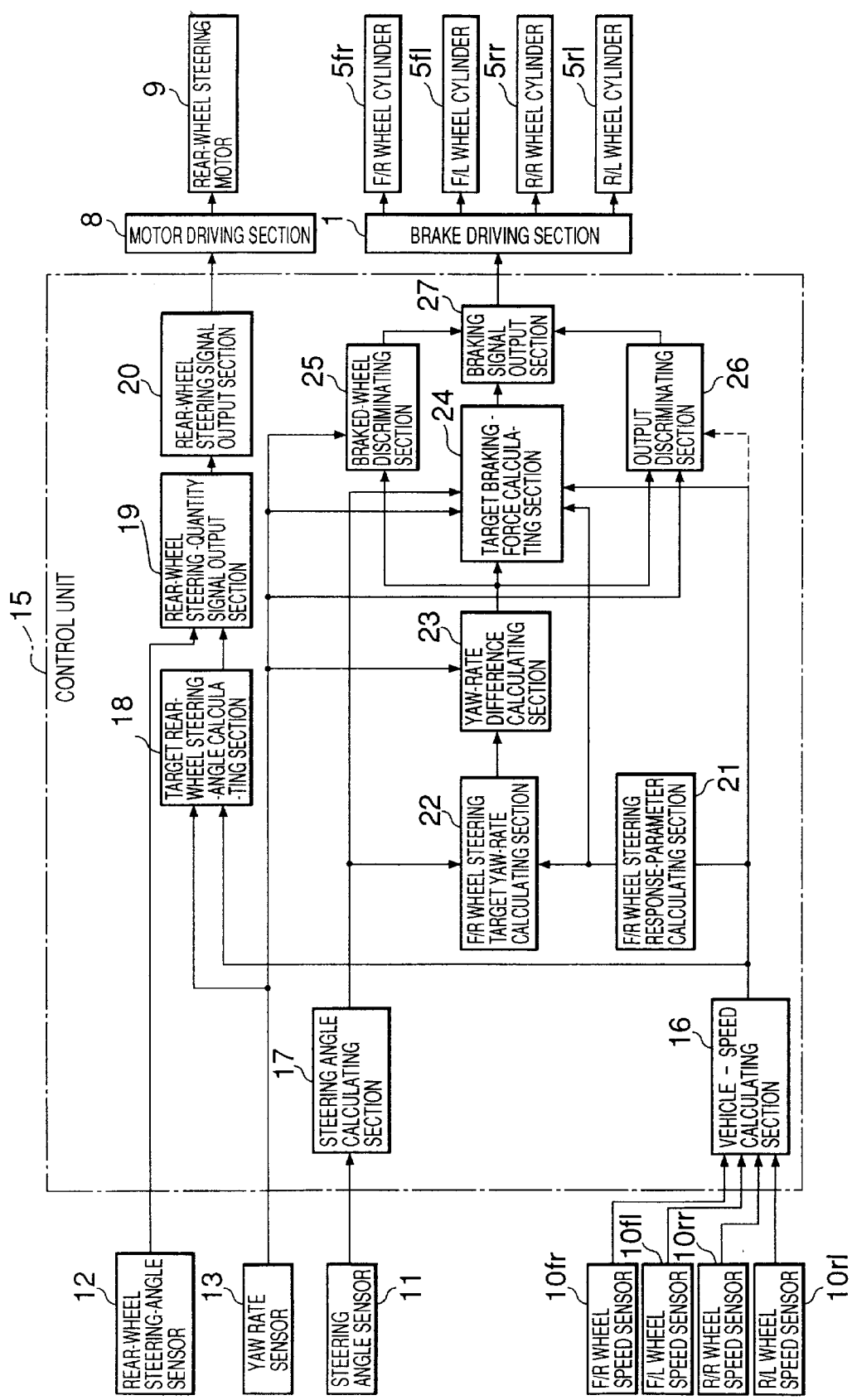
FIG. 1 is a functional block diagram of the first preferred embodiment of a vehicle motion control system according to the present invention.

As shown in FIG. 1, the control unit 15 comprises a vehicle-speed calculating section 16, a steering-angle calculating section 17, a target rear-wheel steering-angle calculating section 18, a rear-wheel steering-quantity setting section 19, a rear-wheel steering signal output section 20, a front-and-rear wheel steering response-parameter calculating section 21, a front-and-rear wheel steering target yaw-rate calculating section 22, a yaw-rate difference calculating section 23, a target braking-force calculating section 24, a braked-wheel discriminating section 25, an output discriminating section 26 and a braking-signal output section 27.

The vehicle-speed calculating section 16 receives signals of wheel speeds $\omega1$, $\omega2$, $\omega3$ and $\omega4$ from the respective wheel speed sensors 10fl, 10fr, 10rl and 10rr to derive a vehicle speed V by calculating these signals in accordance with a preset numerical formula (for example, by deriving an average value of the speed signals from the respective wheel speed sensors 10fl, 10fr, 10rl and 10rr), to output the derived vehicle speed V to the target rear-wheel steering-angle calculating section 18, the front-and-rear wheel steering response-parameter calculating section 21, and the target braking-force calculating section 24.

The steering-angle calculating section 17 receives signals from the steering-wheel angle sensor 11 to derive an actual front-wheel steering angle $\delta f$ (=$\theta/N$) by dividing a steering-wheel angle $\theta$ by a steering gear ratio N, to output the derived actual front-wheel steering angle $\delta f$ to the target yaw-rate calculating section 22 and the target braking-force calculating section 24.

The target rear-wheel steering-angle calculating section 18 refer to a map on the basis of the vehicle speed V to set a rear-wheel steering-angle coefficient $K\gamma$ and for deriving a target rear-wheel steering angle $\delta r'$ from the rear-wheel steering-angle coefficient $K\gamma$ and the actual yaw rate $\gamma$ to output the derived target rear-wheel steering angle $\gamma r'$ to the rear-wheel steering-quantity setting section 19. The target rear-wheel steering angle $\gamma r'$ is derived by the following formula.

$$\gamma r' = K\gamma \cdot \gamma \quad (1)$$

That is, the steering angle control in the first preferred embodiment of the present invention is a 4 WS control which is a yaw-rate proportional rear-wheel steering angle control.

The rear-wheel steering-quantity setting section 19 sets a required rear-wheel steering quantity from the target rear-wheel steering angle $\delta r'$ and the rear-wheel steering angle $\delta r$. The rear-wheel steering signal output section 20 is formed in a circuit section serving as rear-wheel steering signal output means for outputting a signal corresponding to the rear-wheel steering quantity to the motor driving section 8 of the rear-wheel steering section 7 to drive the rear-wheel steering motor 9.

The front-and-rear wheel steering response-parameter calculating section 21 derives a value of yaw rate (a yaw-rate stationary gain $G\gamma\delta f(0)$) with respect to the front-wheel steering angle $\delta f$ in the stationary circular turning of a vehicle model as a 4WS vehicle model on the basis of a preset formula (a front-and-rear wheel steering yaw-rate stationary gain $G\gamma\delta f(0)4WS$) and for deriving a response natural frequency $\omega n1$, a damping ratio $\zeta 1$ and so forth with respect to the steering of the 4WS vehicle model. The respective response parameters are outputted to the front-and-rear wheel steering target yaw-rate calculating section 22, and the yaw-rate stationary gain $G\gamma\delta f(0)$ is outputted to the target braking-force calculating section 24. Assuming that a wheel base is L and a stability factor determined by items of the 4WS vehicle model is A1, the yaw-rate stationary gain $G\gamma\delta f(0)$ is calculated by the following formula.

$$G\gamma\delta f(0)=G\gamma\delta f(0)4WS=\{1/(1+A1\cdot V^2)\}\cdot V/L \quad (2)$$

Assuming that a stability factor determined by items of the 2WS vehicle model is A0, there is the following relationship between the stability factors A1 and A0.

$$A1=A0+K\gamma/(L\cdot V) \quad (3)$$

Assuming that the mass of the vehicle is m, the distance between a front shaft and the center of gravity is Lf, the distance between a rear shaft and the center of gravity is Lr, a front equivalent cornering power is CPf and a rear equivalent cornering power is CPr, the stability factor A0 is derived by the following formula.

$$A0=\{-m\cdot(Lf\cdot CPf-Lr\cdot CPr)\}/(2\cdot L^2 CPf\cdot CPr) \quad (4)$$

The front-and-rear wheel steering target yaw-rate calculating section 22 calculates a target yaw rate $\gamma'$ (=front-and-rear wheel steering target yaw rate $\gamma'4WS$) in view of a response time lag of the vehicle on the basis of the front-wheel steering angle $\delta f$ from the steering-angle calculating section 17, the respective response parameters $G\gamma\delta f(0)$, $\omega n1$ from the front-and-rear wheel steering response-parameter calculating section 21, the damping ratio $\zeta 1$ and so forth, to output the calculated target yaw rate $\gamma'$ to the yaw-rate difference calculating section 23.

Assuming that a time constant is T and a Laplacean is s, the target yaw rate $\gamma'$ is calculated by the following formula.

$$\gamma'=\gamma'4WS=G\gamma\delta f(0)\cdot(1+T\cdot s)/\{(S^2/\omega n1^2)+(2\cdot\zeta 1\cdot S/\omega n1)+1\}\cdot\delta f \quad (5)$$

For example, the time constant is derived by the following formula.

$$T=(m\cdot Lf\cdot V)/(2\cdot L\cdot CPr) \quad (6)$$

The yaw-rate difference calculating section 23 subtracts the target yaw rate $\gamma'$ outputted from the front-and-rear wheel steering target yaw-rate calculating section 22, from the actual yaw rate $\gamma$ detected by the yaw rate sensor 13, to derive a yaw-rate difference $\Delta\gamma$ (=$\gamma-\gamma'$) to output the derived yaw-rate difference $\Delta\gamma$ to the target braking-force calculating section 24, the braked-wheel discriminating section 25 and the output discriminating section 26.

The target braking-force calculating section 24 calculates a target braking force (a front-wheel target fluid pressure BF2f, a rear-wheel target fluid pressure BF2r) in view of the vehicle items on the basis of the motion conditions of the vehicle (the vehicle speed V, the front-wheel steering angle $\delta f$, the actual yaw rate $\gamma$), the yaw-rate stationary gain $G\gamma\delta f(0)$ and the yaw-rate difference $\Delta\gamma$. The calculated target fluid pressures BF2f and Bf2r are outputted to the braking signal output section 27. The target fluid pressures BF2f and Bf2r are calculated, for example, by the following formulae:

$$BF2f=G1\cdot(\Delta A\cdot 4\cdot L^2\cdot CPf\cdot Cpr\cdot V)/\{(CPf+CPr)/df\}\cdot\gamma \quad (7)$$

$$BF2r=G1\cdot(\Delta A\cdot 4\cdot L^2\cdot CPf\cdot Cpr\cdot V)/\{(CPf+CPr)/dr\}\cdot\gamma \quad (8)$$

wherein G1 is a gain, df is a front tread, dr is a rear tread, and ΔA is expressed by the following formula.

$$\Delta A = \{\delta f / (G\gamma \delta f(0) \cdot \delta f + \Delta \delta) - 1/G\gamma \delta f(0)\}/(L \cdot V) \quad (9)$$

Furthermore, Δγ in the formula (9) may be corrected in view of a side slip angle β which is an angle between the running direction of the vehicle and the forward and rearward directions, and the corrected Δγ may be used in the formula (9). In addition, in order to prevent the side slip of the rear wheels of a vehicle due to the braking force applied thereto, from causing the vehicle to be unstable particularly when the vehicle is running on a low μroad surface, or in order to prevent the driver from feeling the instability of the vehicle due to strong moment of vehicle turning-round against the driver's intention when the braking force is applied to the rear wheels, the rear-wheel target fluid pressure BF2r may be a smaller value which is derived by multiplying the value derived in accordance with the formula (8), by a gain which is greater than 0 and smaller than 1.

The braked-wheel discriminating section 25 discriminates a wheel of the vehicle to be braked on the basis of the combination of the signs of the actual yaw rate γ and the yaw-rate difference Δγ, and the following combinations are preset therein. Furthermore, both signs of the actual yaw rate γ and the target yaw rate γ' are given assuming that the turning direction of the vehicle to the left is plus (+) and to the right is minus (−). In addition, it is set that is a positive number of approximately 0 derived by experiment, calculation or the like in order to determine that the vehicle is in a running straight condition, and it is set that εΔγ is a positive number of approximately 0 derived by experiment, calculation or the like in order to determine that the vehicle is in a substantially neutral-steer condition with respect to the target yaw rate γ'. Moreover, the following settings are performed.

(Case 1): when γ>ε and Δγ<−εΔγ, i.e. when the vehicle is turning to the left and its behavior is in an under-steer tendency with respect to the target yaw rate γ', the rear-left wheel is braked.

(Case 2): when γ>ε and Δγ>εΔγ, i.e. when the vehicle is turning to the left and its behavior is in an over-steer tendency with respect to the target yaw rate γ', the front-right wheel is braked.

(Case 3): when γ<ε and Δγ<−εΔγ, i.e. when the vehicle is turning to the right and its behavior is in the over-steer tendency with respect to the target yaw rate γ', the front-left wheel is braked.

(Case 4): when γ<ε and Δγ>εΔγ, i.e. when the vehicle is turning to the right and its behavior is in the under-steer tendency with respect to the target yaw rate γ', the rear-right wheel is braked.

Figure 3:
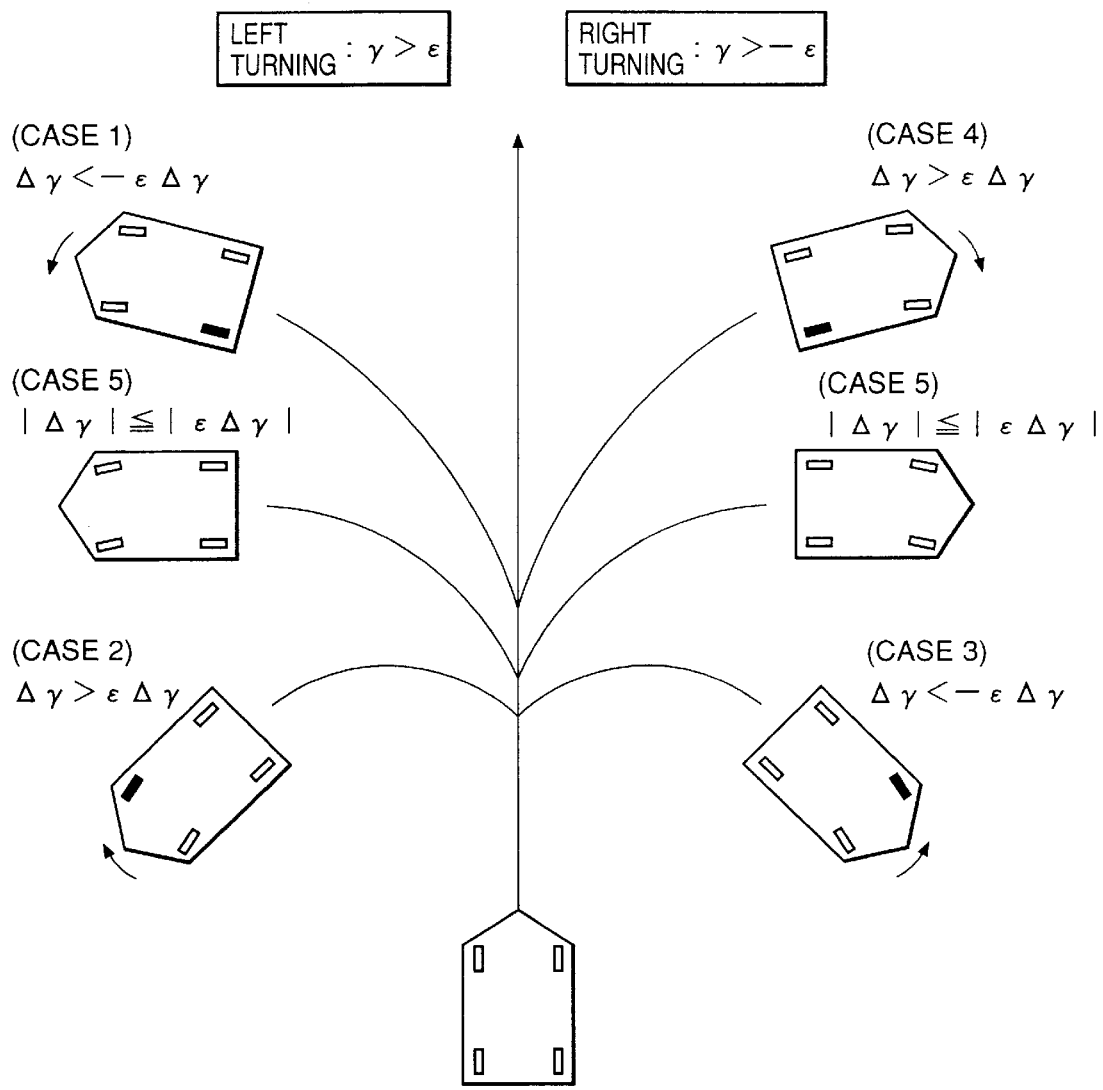
FIG. 3 is an explanatory drawing of the movements of an automotive vehicle according to the first preferred embodiment of a braking force control of the present invention.

(Case 5): when |γ|<|ε|, i.e. when the vehicle is running substantially straight, or when |Δγ|≦|εΔγ|, i.e. when the vehicle is running in the substantially neutral-steer condition, the selection of the wheel to be braked is not performed and no wheel is braked (FIG. 3).

That is, in the ranges of the actual yaw rate γ and the yaw-rate difference Δγ except for the case of the substantially straight running condition determined by |γ|<|ε| in case 5 and for the case of the substantially neutral-steer condition with respect to the target yaw rate γ' determined by |Δγ|≦|εΔγ|, when the sign of the actual yaw rate γ is different from the sign of the yaw-rate difference Δγ, the rear-inside wheel is selected as the wheel to be braked, and when the sign of the actual yaw rate γ is the same as the sign of the yaw-rate difference Δγ, the front-outside wheel is selected as the wheel to be braked. The results from the braked-wheel discriminating section 25 are outputted to the braking signal output section 27.

The output discriminating section 26 sets a discriminating threshold εΔ which discriminates as to whether the yaw-rate difference Δγ is within a control region, in a manner as described later, and for comparing the discriminating threshold εΔ with the yaw-rate difference Δγ to discriminate as to whether the yaw-rate difference Δγ is within the control region, to output the results to the braking signal output section 27.

As the discriminating threshold εΔ, a first threshold εΔM is usually set. After the vehicle behavior changes from the under-steer tendency to the over-steer tendency, a second threshold εΔS is set as the discriminating threshold εΔ for a preset time (for a period of time preset in a timer), or until any one of the values of the yaw-rate difference and the actual yaw rate is approximately zero after the behavior changes to the over-steer tendency even if it is within the preset time. Both of the first threshold εΔM and the second threshold εΔS are positive values predetermined by experiment, or the like. The relationship between the respective thresholds for discriminating the yaw-rate difference Δγ is |εΔM|>|εΔS|≧|εΔγ|.

Figure 9A:
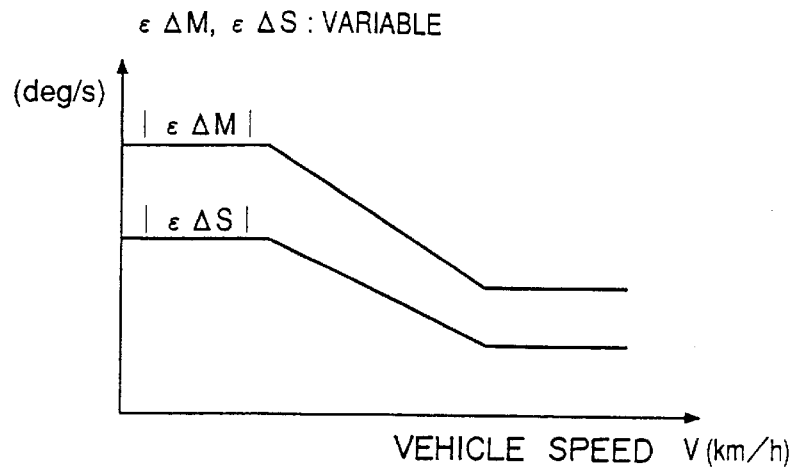
FIGS. 9(a), 9(b) and 9(c) are graphs showing the characteristics of discrimination thresholds in the first preferred embodiment according to the present invention.
Figure 9B:
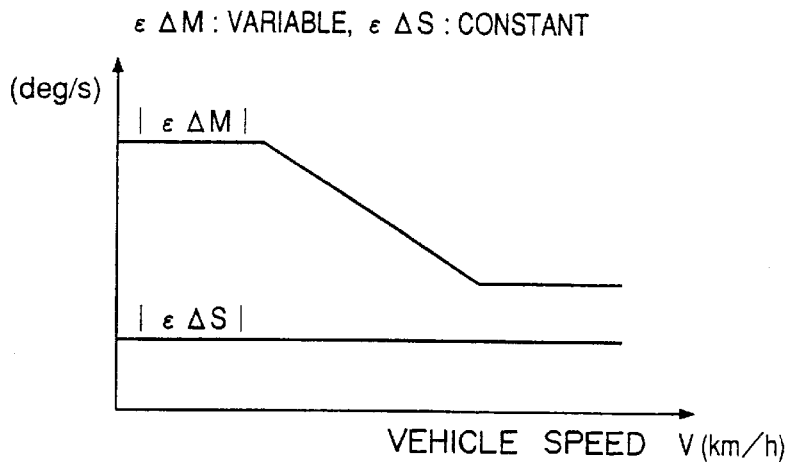
Figure 9C:
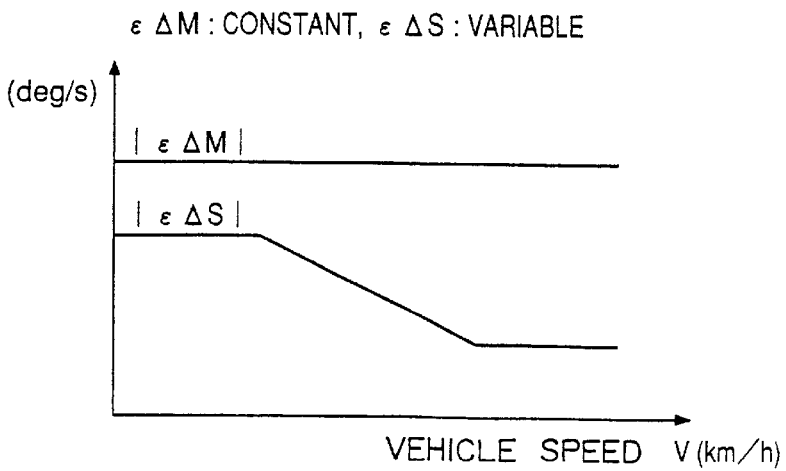

Furthermore, if at least one of the first threshold εΔM and the second threshold εΔS is variably set in a memory table in accordance with the vehicle speed as shown in FIG. 9, it is possible to set more suitable value in accordance with the vehicle speed as the discriminating threshold εΔ. That is, when the vehicle speed is low, even if the vehicle behavior is unstable, the driver can simply correct such unstable behavior in comparison with the case of a higher vehicle speed, so that no control is required. Therefore, it is possible to set a relatively great non-control region. For that reason, as shown in FIG. 9(a), the first threshold εΔM and the second threshold εΔS may be so set as to decrease as the vehicle speed increases. Alternatively, as shown in FIG. 9(b), the second threshold εΔS may be set to be constant while the first threshold εΔM may be so set as to decrease as the vehicle speed increases. Moreover, as shown in FIG. 9(c), the first threshold εΔM may be set to be constant while the second threshold εΔS may be so set as to decrease as the vehicle speed increases.

The braking signal output section 27 is provided for outputting a discriminating signal which indicates the control region discriminated in the output discriminating section 26, to the brake driving section 1 so as to add the front-wheel target fluid pressure BF2f or the rear-wheel target fluid pressure BF2r calculated by the target braking-force calculating section 24, to the braked wheel selected by the braked-wheel discriminating section 25.

Referring to the flow charts of FIGS. 4 and 5, the first preferred embodiment of a vehicle motion control according to the present invention will be described below.

This vehicle motion control program is executed every predetermined time (for example, 10 ms) while the vehicle is running. After the program is started, at step 101, a steering angle θ is read out from the steering-wheel angle sensor 11, wheel speeds ω, ω2, ω3 and ω4 are read out from the respective wheel-speed sensors 10fl, 10fr, 10rl and 10rr, an actual yaw rate γ is read out from the yaw rate sensor 13, and a rear-wheel steering angle δr is read out from the rear-wheel steering-angle sensor 12. Then, the routine goes to step 102.

At step 102, the steering angle calculating section 17 calculates an actual front-wheel steering angle δf (=θ/N) on the basis of the steering-wheel angle θ, the vehicle-speed detecting section 16 calculates a vehicle speed V on the basis of the respective wheel speeds $\omega 1$, $\omega 2$, $\omega 3$ and $\omega 4$.

Then, the routine goes to step 103 wherein the front-and-rear wheel steering response-parameter calculating section 21 calculates vehicle response parameters, i.e. a yaw-rate stationary gain $G\gamma\delta f(0)$ ($=G\gamma\delta f(0)4WS$), $\omega n1$ and $\zeta 1$.

Then, the routine goes to step 104 wherein the target yaw-rate calculating section 23 calculates a target yaw rate $\gamma'$ ($=\gamma'4WS$) in accordance with the formula (5), and then, the routine goes to step 105 wherein a rear-wheel steering signal is outputted in accordance with a front-and-rear wheel steering control routine as described later.

Then, the routine goes to step 106 wherein the yaw-rate difference calculating section 23 calculates a yaw-rate difference $\Delta\gamma$ ($=\gamma-\gamma'$). Then, the routine goes to step 107 wherein the target braking-force calculating section 24 calculates a front-wheel target fluid pressure BF2f and a rear-wheel target fluid pressure BF2r in accordance with the formulae (7) and (8), and the routine goes to step 108.

Steps 108 through 118 correspond to the processings performed by the braked-wheel discriminating section 25. First, at step 108, it is discriminated as to whether the actual yaw rate is greater than $\epsilon$, i.e. whether the vehicle is turning to the left to a greater extent than a certain extent. When the actual yaw rate $\gamma$ is not greater than $\epsilon$, the routine goes to step 109 wherein it is discriminated that the actual yaw rate $\gamma$ is smaller than $-\epsilon$, i.e. whether the vehicle is turning to the right to a greater extent than a certain extent. In the range of the actual yaw rate $\gamma$ ($\epsilon \leq \gamma \leq -\epsilon$) which is discriminated at the step 109 that the vehicle is not turning to the right to a greater extent than a certain extent, the vehicle is running substantially straight, so that the routine goes to step 118 wherein the selection of the wheel to be braked is not performed and no wheel is braked. Furthermore, when it is discriminated at the step 108 that $\gamma < \epsilon$ and the vehicle is turning to the left to a greater extent than a certain extent, the routine goes to step 110 wherein it is discriminated as to whether the yaw-rate difference $\Delta\gamma$ is $|\Delta\gamma| \leq |\epsilon\Delta\gamma|$ and approximately 0, and the vehicle behavior is substantially neutral-steer.

When it is discriminated in step 110 that $|\Delta\gamma| \leq |\epsilon\Delta\gamma|$ and the vehicle behavior is substantially neutral-steer, the routine goes to step 118, and in other cases (in the cases of the under-steer tendency and the over-steer tendency), the routine goes to step 111.

At step 111, it is discriminated that the vehicle behavior is the under-steer tendency or the over-steer tendency, and whether $\Delta\gamma < -\epsilon\Delta\gamma$ or $\Delta\gamma > \epsilon\Delta\gamma$. When $\Delta\gamma < -\epsilon\Delta\gamma$ and the sign of the yaw-rate difference $\Delta\gamma$ is negative which is different from the sign of the actual yaw rate $\gamma$, it is discriminated that the vehicle behavior is in the under-steer tendency with respect to the target yaw rate $\gamma'$, and the routine goes to step 112. On the other hand, when $\Delta\gamma < \epsilon\Delta\gamma$ and the sign of the yaw-rate difference $\Delta\gamma$ is positive which is the same as the sign of the actual yaw rate $\gamma$, it is discriminated that the vehicle behavior is in the over-steer tendency with respect to the target yaw rate $\gamma'$, and the routine goes to step 113.

At step 112, the rear-left wheel 4rl is selected as the wheel which is to be braked by the rear-wheel target fluid pressure BF2r derived at the step 107 (the rear-left wheel fluid pressure BRL=BF2r).

At step 113, the front-right wheel 4fr is selected as the wheel which is to be braked by the front-wheel target fluid pressure BF2f derived at the step 107 (the front-right wheel fluid pressure BRF=BF2f).

When it is discriminated at the step 109 that $\gamma < -\epsilon$ and the vehicle is turning to the right to a greater extent than a certain extent, the routine goes to step 114 wherein it is discriminated that the yaw-rate difference $\Delta\gamma$ is $|\Delta\gamma| \leq |\epsilon\Delta\gamma|$ and approximately 0, and the vehicle behavior is substantially neutral-steer.

When it is discriminated at the step 114 that $|\Delta\gamma| \leq |\epsilon\Delta\gamma|$ and the vehicle behavior is substantially neutral-steer, the routine goes to step 118, and in other cases (in the cases of the under-steer tendency and the over-steer tendency), the routine goes to step 115.

At step 115, it is discriminated that the vehicle behavior is the under-steer tendency or the over-steer tendency, and whether $\Delta\gamma < \epsilon\Delta\gamma$ or $\Delta\gamma < -\epsilon\Delta\gamma$. When $\Delta\gamma > \epsilon\Delta\gamma$ and the sign of the yaw-rate difference $\Delta\gamma$ is positive which is different from the sign of the actual yaw rate $\gamma$, it is discriminated that the vehicle behavior is in the under-steer tendency with respect to the target yaw rate $\gamma'$, and the routine goes to step 116. On the other hand, when $\Delta\gamma < -\epsilon\Delta\gamma$ and the sign of the yaw-rate difference $\Delta\gamma$ is negative which is the same as the sign of the actual yaw rate $\gamma$, it is discriminated that the vehicle behavior is in the under-steer tendency with respect to the target yaw rate $\gamma'$, and the routine goes to step 117.

At step 116, the rear-right wheel 4rr is selected as the wheel which is to be braked by the rear-wheel target fluid pressure BF2r derived at the aforementioned step 107 (the rear-right wheel fluid pressure BRR=BF2r).

At step 117, the front-left wheel 4fl is selected as the wheel which is to be braked by the front-wheel target fluid pressure BF2f derived at the step 107 (the front-left wheel fluid pressure BRL=BF2f).

Furthermore, when the routine goes to step 118 from the step 109, 110 or 114, the selection of the wheel to be braked is not performed and no wheel is braked.

When the processing in the under-steer tendency (the selection of the wheel to be braked and the setting of the fluid pressure) is performed at step 112 or 116, the routine goes to step 119. When the processing in the over-steer tendency (the selection of the wheel to be braked and the setting of the fluid pressure) is performed at step 113 or 117, the routine goes to step 120. From step 118, the routine goes to step 121.

After the processing in the under-steer tendency is performed at the step 112 or 116, when the routine goes to step 119, an under-steer condition passing flag FUS is set (FUS←1) and the routine goes to step 125. This under-steer condition passing flag FUS is a flag which exhibits that the driving in the under-steer tendency was performed and which is cleared by means of a threshold setting timer or when the vehicle behavior changes from the over-steer tendency to the neutral-steer tendency (FUS←0).

After the processing in the over-steer tendency is performed at the step 113 or 117, when the routine goes to step 120, it is discriminated as to whether the flag FUS is set (FUS=1). When it is discriminated that the flag FUS is set and the driving in the under-steer tendency was performed, the routine goes to step 122. When it is discriminated that the flag FUS is 0, the routine goes to step 125. In general, since the vehicle behavior passes through the under-steer tendency before the vehicle behavior is in the over-steer tendency, when the vehicle behavior changes from the under-steer tendency to the over-steer tendency, the flag FUS should be set, so that the routine goes from step 120 to step 122. However, when the flag FUS has been cleared by means of the threshold setting timer or when the vehicle behavior has changed to the over-steer tendency without passing through the under-steer tendency, the routine jump to step 125.

After it is discriminated at step 120 that FUS=1, it is discriminated at step 122 that a timer start flag (FTR) is cleared (FTR=0). This timer start flag FTR is a flag which is set (FTR←1) when the threshold setting timer is started and which is cleared (FRT←0) when the threshold setting timer is stopped.

When it is discriminated at step 122 that the flag FTR is cleared (FTR=0) and the threshold setting timer is stopped, the routine goes to step 123 wherein the threshold setting timer is caused to be started and the flag FTR is set. Then, the routine goes to step 124 wherein the second threshold $\epsilon\Delta S$ is set as the discriminating threshold $\epsilon\Delta$, and the routine goes to step 125.

On the other hand, when it is discriminated at step 122 that the flag FTR is set (FTR=1) and the threshold setting timer is actuated, the routine goes to step 125.

When the routine goes to step 125 after it is discriminated at step 119 or 120 that the flag FUS=0, or after it is discriminated at step 122 that the flag FTR=1, or after step 124, the yaw-rate difference $\Delta\gamma$ is compared with the discriminating threshold $\epsilon\Delta$ (the comparison for the absolute values). When the yaw-rate difference $\Delta\gamma$ is within the control region ($|\Delta\gamma|<|\epsilon\Delta|$), the routine goes to step 126 wherein the braking signal output section 27 outputs a signal to the brake driving section 1. That is, in a case where it is discriminated at the step 125 that the yaw-rate difference $\Delta\gamma$ is within the control region, when the routine passes through the steps 112 to 119, the brake driving section 1 causes the wheel cylinder 5rl to produce braking force corresponding to the fluid pressure BRL=BF2r, and when the routine passes through the steps 116 to 119, the brake driving section 1 causes the wheel cylinder 5rr to produce braking force corresponding to the fluid pressure BRR=BF2r. In addition, when the routine passes through the steps 113 to 120, the brake driving section 1 causes the wheel cylinder 5fr to produce braking force corresponding to the fluid pressure BFR=BF2f, and when the routine passes through the steps 117 to 120, the brake driving section 1 causes the wheel cylinder 5fl to produce braking force corresponding to the fluid pressure BFL=BF2f.

On the other hand, when it is discriminated at the step 125 that the yaw-rate difference $\Delta\gamma$ is within the non-control region ($|\Delta\gamma|\leq|\epsilon\Delta|$), the routine goes to step 127.

In addition, when the routine goes from the step 118 to step 121, a straight or stationary running condition flag FNS indicating that the vehicle is running substantially straight or in the substantially neutral-steer condition, is set (FNS←1), and the routine goes to step 127.

When the routine goes from the step 121 or 125 to step 127, no control signal is output and the set fluid pressure is cleared. That is, the processing at the step 126 or 127 is performed by the control signal output section 27.

Thereafter, when the routine goes to step 128, it is discriminated that the timer start flag FTR is set (whether the threshold setting timer is operated).

At the step 128, the flag FTR is cleared. When the threshold setting timer is not operated, the routine goes to step 134 wherein the flag FNS is cleared, and then, the routine returns to START. On the other hand, when the flag FTR is set and the threshold setting timer is operated, the routine goes to step 129 wherein it is discriminated as to whether a predetermined period of time elapsed.

When it is determined at step 129 that the predetermined period of time elapsed, the routine goes to step 131 wherein the flag FUS is cleared. Then, the first threshold $\epsilon\Delta M$ is set as the discriminating threshold $\epsilon\Delta$ at step 132, and the threshold setting timer is stopped and the flag FTR is cleared at step 133. Then, the flag FNS is cleared at step 134, and then, the routine returns to START.

When it is determined at step 129 that the predetermined period of time has not elapsed, the routine goes to step 130 wherein it is determined as to whether the flag FNS is set (FNS=1).

When the flag FNS is cleared (FNS=0), the routine returns START. On the other hand, when the flag FNS is set, the routine goes to step 131 wherein the flag FUS is cleared. Then, the first threshold $\epsilon\Delta M$ is set as the discriminating threshold $\epsilon\Delta$ at step 132, and the threshold setting timer is stopped and the flag FTR is cleared at step 133. Then, the flag FNS is cleared at step 134, and then, the routine returns to START.

That is, even if the vehicle running condition is the straight or stationary running condition before the threshold setting timer is stopped, the first threshold $\epsilon\Delta M$ is designed to be set as the discriminating threshold $\epsilon\Delta$.

Figure 6:
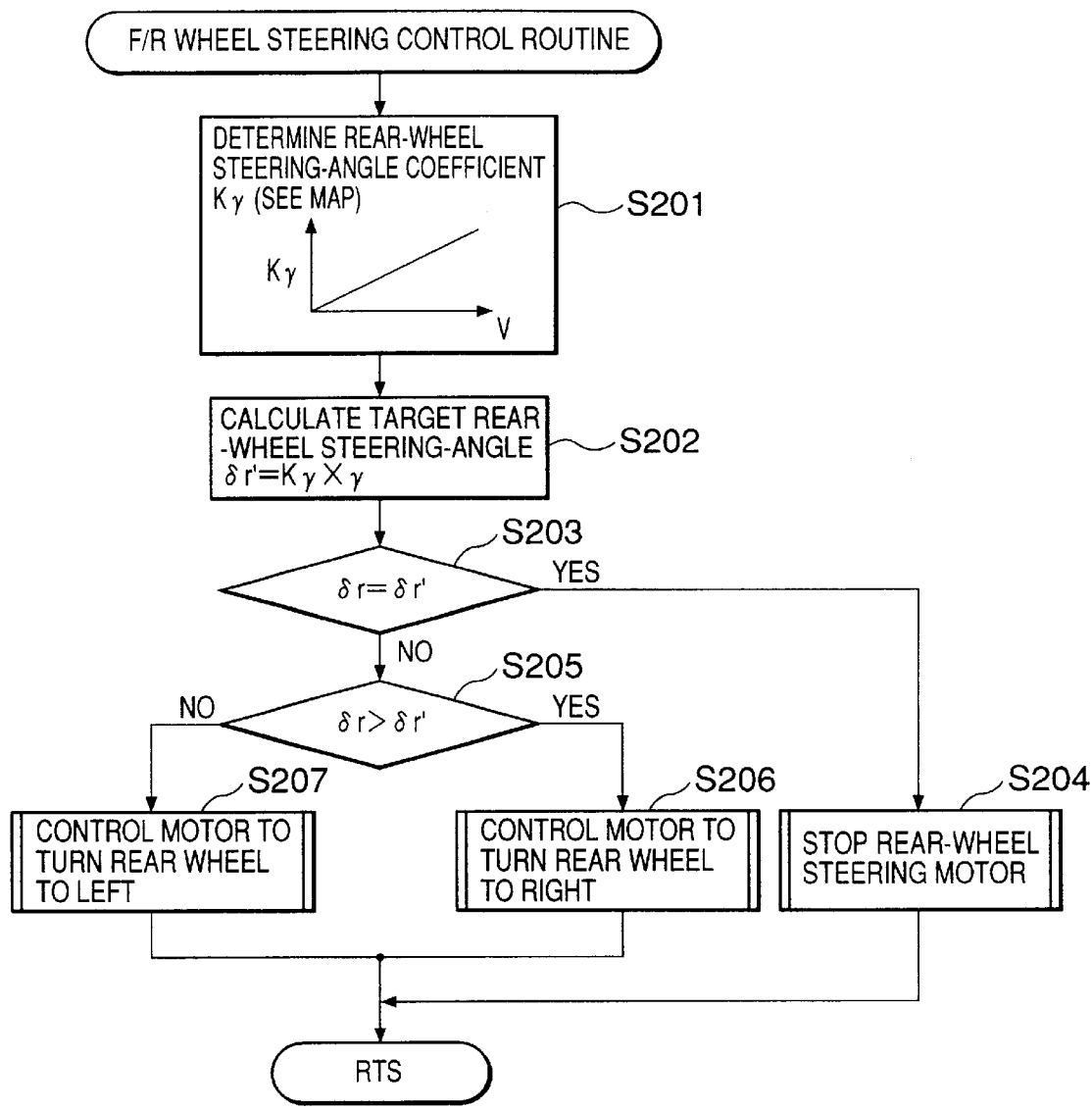
FIG. 6 is a flow chart of a control routine for steering front and rear wheels in the first preferred embodiment according to the present invention.

Referring to the flow chart of FIG. 6, the front-and-rear wheel steering control routine at the step 105 will be described below.

First, at step 201, a rear-wheel steering coefficient $K\gamma$ is set referring to a map on the basis of the vehicle speed V. Then, the routine goes to step 202 wherein a target rear-wheel steering angle $\delta r'$ is derived from the rear-wheel steering coefficient $K\gamma$ and the actual yaw rate $\gamma$ in accordance with the formula (1), and the routine goes to step 203. That is, the procedures at steps 201 and 202 are performed in the target rear-wheel steering-angle calculating section 18.

When the routine goes to step 203, it is determined that the rear-wheel steering angle $\delta r$ detected by the rear-wheel steering angle sensor 12 is the same as the target rear-wheel steering angle $\delta r'$ calculated at step 202. When the value of the rear-wheel steering angle $\delta r$ is the same value as that of the target rear-wheel steering angle $\delta r'$ ($\delta r=\delta r'$), the routine goes to step 204 wherein a signal is outputted to the motor driving section 8 to stop the rear-wheel steering motor 9.

On the other hand, when the rear-wheel steering angle $\delta r$ is different from the target rear-wheel steering angle $\delta r'$, the routine goes to step 205. When the rear-wheel steering angle $\delta r$ is greater than the target rear-wheel steering angle $\delta r'$ ($\delta r>\delta r'$), the routine goes to step 206 wherein a signal is outputted to the motor driving section 8 to control the rear-wheel steering motor 9 so as to cause the rear wheels to turn to right. When the rear-wheel steering angle $\delta r$ is smaller than the target rear-wheel steering angle $\delta r'$ ($\delta r<\delta r'$), the routine goes to step 207 wherein a signal is outputted to the motor driving section 8 to control the rear-wheel steering motor 9 so as to cause the rear wheels to turn to left, and then, the routine returns to START. Furthermore, the setting of the rear-wheel steering quantity is performed at steps 206 and 207. That is, the procedures at steps 203 through 207 are performed in the rear-wheel steering-quantity setting section 19 and the rear-wheel steering signal output section 20.

By the steering angle control as set forth above, the rear-wheel steering angle with respect to the actual yaw rate $\gamma$ is suitably controlled to improve the running stability of the vehicle.

Figure 4:
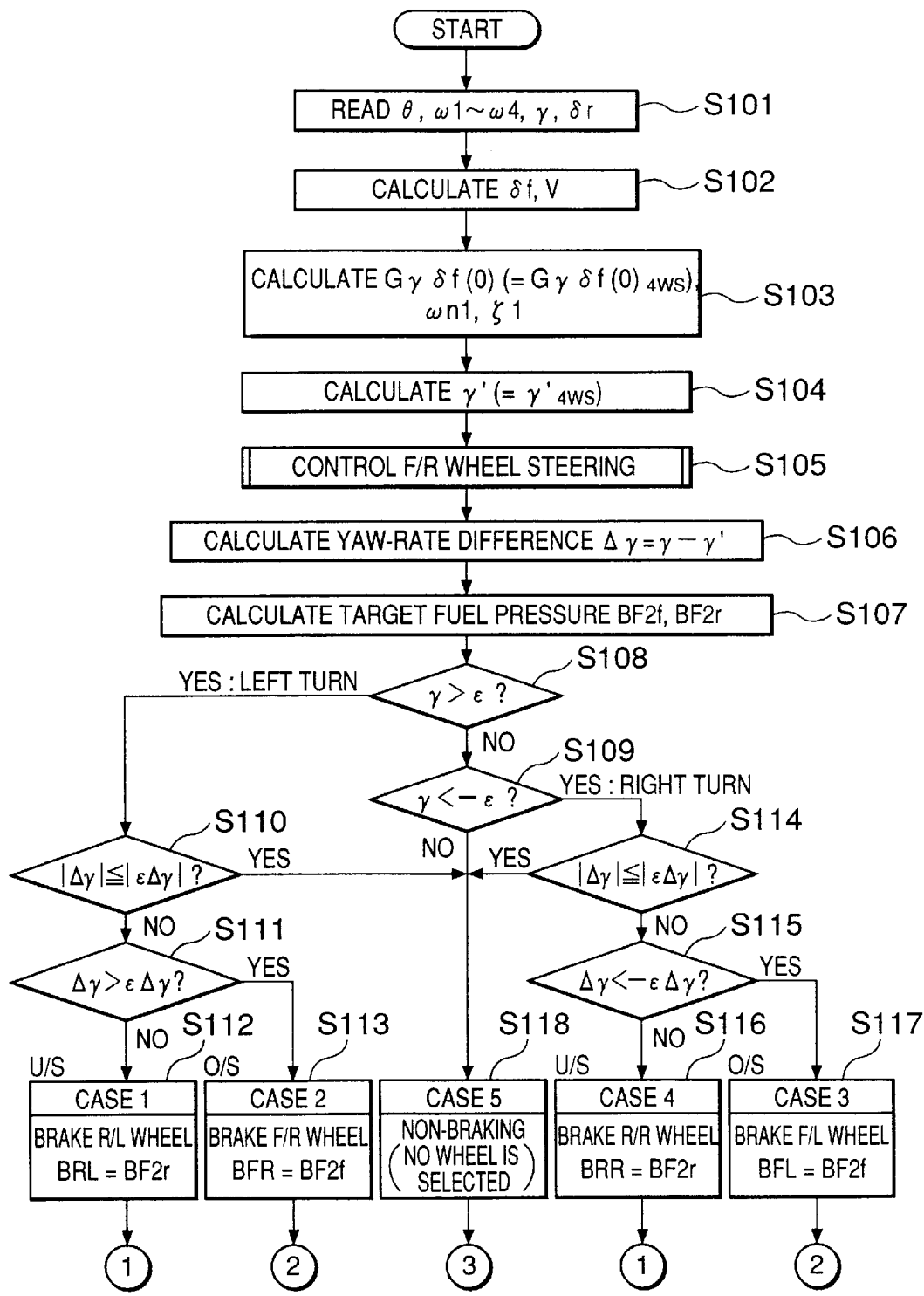
FIG. 4 is a flow chart of a vehicle motion control in the first preferred embodiment according to the present invention.
Figure 5:
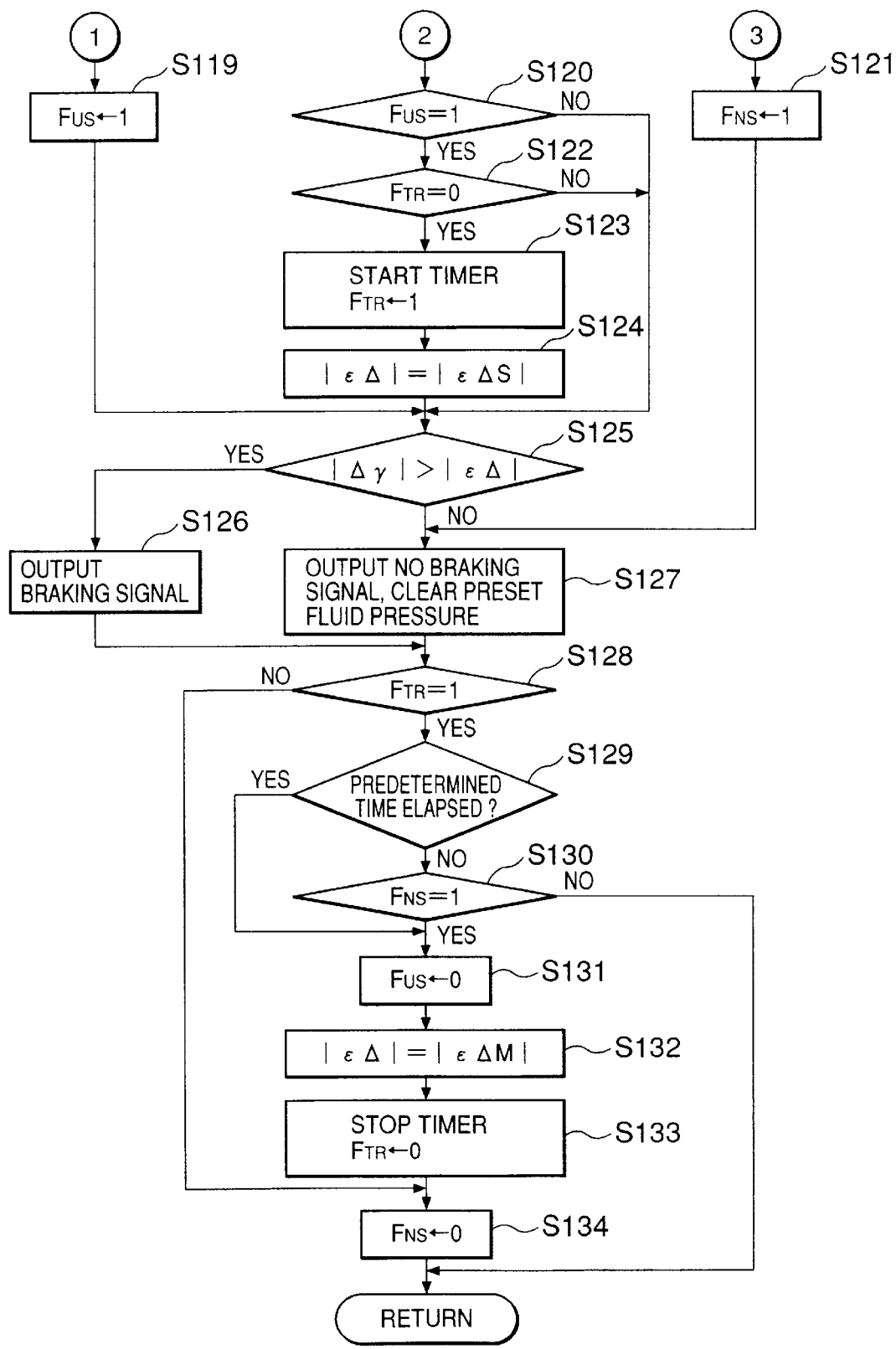
FIG. 5 is a flow chart following that of FIG. 4.
Figure 7:
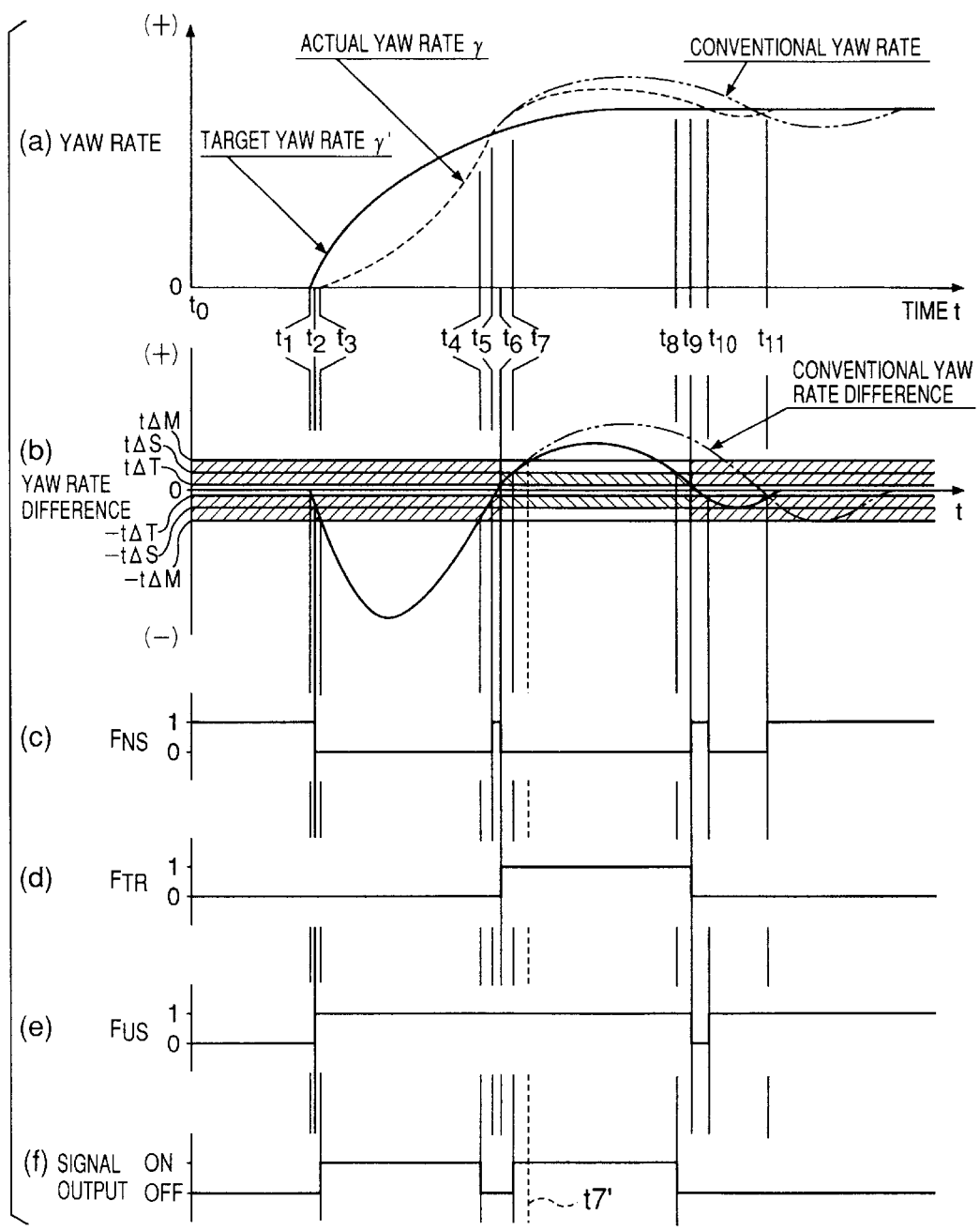
FIG. 7 is a time chart showing an example of a braking force control in the fourth preferred embodiment according to the present invention.

FIG. 7 shows an example of the control performed in the flow chart of FIGS. 4 and 5. This figure illustrates an example of the case that a vehicle which has being run straight from t0 turns to the left at t1. FIG. 7(a) shows the transitions in the target yaw rate $\gamma'$ and in the actual yaw rate $\gamma$, FIG. 7(b) shows the transition in the yaw-rate difference $\Delta\gamma$, FIG. 7(c) shows the setting of the straight or stationary running condition flag FNS during the control, FIG. 7(d) shows the setting of the timer start flag FTR during the control, FIG. 7(e) shows the setting of the under-steer condition passing flag FUS during the control, and FIG. 7(f) shows ON-OFF of the braking signal output from the braking signal output section 27. After t1, although the actual yaw rate γ increases so as to follow the gradually increasing target yaw rate γ', the difference between the actual yaw rate γ and the target yaw rate γ' gradually increases, so that the difference between the actual yaw rate γ and the target yaw rate γ', i.e. the yaw-rate difference Δγ, varies in the negative direction so that the absolute value thereof |Δγ| increases.

After t2, the absolute value |Δγ| of the yaw-rate difference Δγ is greater than the absolute value |εΔγ| of the threshold εΔγ which discriminates the substantially neutral-steer condition, so that the vehicle behavior is in the under-steer tendency with respect to the target yaw rate γ' and the flag FUS is set. In addition, the straight or stationary running condition flag which has been set before t2 is cleared after t2. Moreover, the first threshold εΔM is set as the discriminating threshold εΔ of the non-control region (the region expressed by the slanting lines in FIG. 7(b)), so that no braking signal is outputted until the absolute value |Δγ| of the yaw-rate difference Δγ is greater than the absolute value |εΔ| of the discriminating threshold εΔ at t3.

After t3, until the absolute value |Δγ| of the yaw-rate difference Δγ is smaller than the absolute value |εΔ| of the discriminating threshold εΔ again at t4, the braking signal is outputted. The output of this braking signal corresponds to the case that γ>ε (positive, turning to left), Δγ<−εΔγ (negative, the under-steer tendency), i.e. the case 1 in FIG. 3. In this case 1, braking force is applied to the rear-left wheel 4rl to add moment expressed by the arrow to the vehicle, so as to prevent the drift-out of the vehicle. Furthermore, in this condition, even if excessive braking force is applied to the rear-left wheel 4rl which tends to be locked so as to lose the lateral force, the vehicle turns toward the over-steer, so that it is possible to produce a yaw rate in the same direction as the original control rule (in the direction of the arrow).

Between t4 and t5 wherein the actual yaw rate γ is approaching the target yaw rate γ', the vehicle behavior is in the under-steer tendency. However, since the absolute value |Δγ| of the yaw-rate difference Δγ is smaller than the absolute value |εΔ| of the discriminating threshold εΔ and the vehicle behavior is within the non-control region, no braking signal is outputted. In addition, between t5 and 6, the absolute value |Δγ| of the yaw-rate difference Δγ is smaller than the absolute value |εΔγ| of the threshold εΔγ, so that the vehicle behavior is in the substantially neutral-steering condition and the flag FNS is set.

When the yaw-rate difference Δγ varies in the positive direction so that the absolute value thereof |Δγ| increases and when the vehicle behavior is in the over-steer tendency with respect to the target yaw rate γ' after t6, the straight or stationary running condition flag FNS is cleared, the flag FTR is set, the threshold setting timer is operated, and the second threshold εΔS which is smaller than the first threshold εΔM is set as the discriminating threshold εΔ.

Thereafter, before t7, the absolute value |Δγ| of the yaw-rate difference Δγ is smaller than the absolute value |εΔ| of the discriminating threshold εΔ, so that no braking signal is outputted, and after t7, the braking signal is outputted. The output of this braking signal corresponds to the case that γ>ε (positive, turning to left), Δγ>εΔγ (positive, the over-steer tendency), i.e. the case 2 in FIG. 3. In this case 2, braking force is applied to the front-right wheel 4fr to add moment expressed by the arrow to the vehicle, so as to prevent the vehicle from spinning. In this condition, even if excessive braking force is applied to the front-right wheel 4fr which tends to be locked so as to lose the lateral force, the vehicle turns toward the under-steer, so that it is possible to produce a yaw rate in the same direction as the original control rule (in the direction of the arrow).

After t8, the absolute value |Δγ| of the yaw-rate difference Δγ is smaller than the absolute value |εΔ| of the discriminating threshold εΔ, and the vehicle behavior is within the non-control region, so that the vehicle behavior is in the substantially neutral-steering condition after t9 before the threshold setting timer is stopped.

For that reason, at t9, the flag FNS is set, the flag FUS is cleared, the threshold setting timer is stopped, and the flag FTR is cleared. In addition, the first threshold value εΔM is set as the discriminating threshold εΔ.

Thereafter, between t10 and t11, the absolute value |Δγ| of the yaw-rate difference Δγ is greater than the absolute value |εΔγ| of the threshold εΔγ again, so that the flag FNS is cleared, the vehicle behavior is in the under-steer tendency with respect to the target yaw rate γ' and the flag FUS is set.

After t11, the absolute value |Δγ| of the yaw-rate difference Δγ is smaller than the absolute value |εΔγ| of the threshold εΔγ again, so that the vehicle behavior is in the substantially neutral-steer condition (the straight or stationary running condition flag FNS is also set) and the value of the actual yaw rate γ is substantially the same as that of the target yaw rate γ'. In this case, although the flag FUS remains being set, there is no problem since the vehicle behavior passes through the under-steer tendency before it is in the over-steer tendency.

Furthermore, after t8, the absolute value |Δγ| of the yaw-rate difference Δγ is smaller than the absolute value |εΔ| of the discriminating threshold εΔ and the vehicle behavior is within the non-control region, so that no braking signal is outputted.

That is, the output discriminating section 26 sets the second threshold εΔS, the absolute value of which is smaller than that of the first threshold εΔM, as the discriminating threshold εΔ for a predetermined setting period of time after the vehicle behavior is changed from the under-steer tendency to the over-steer tendency, or until the control in the over-steer tendency is completed if the predetermined setting period of time does not elapse. Therefore, the control can be done immediately after the vehicle behavior is changed from the under-steer tendency to the over-steer tendency (as expressed by the two-dot chain line in FIG. 7, the conventional control is started at t7' when the vehicle behavior is changed from the under-steer tendency to the over-steer tendency). For that reason, the difference between the actual yaw rate γ and the target yaw rate γ' can be relatively small after the over-steer tendency. In addition, it is possible to quickly converge the actual yaw rate γ on the target yaw rate γ', and it is possible to smoothly perform the control without giving uncomfortable feeling or a sense of incompatibility to the driver. In addition, when the vehicle behavior is changed from the under-steer tendency to the over-steer tendency, the non-control region is set to be relatively great in the under-steer tendency wherein the braking force control of the rear wheels is performed, and the non-control region is set to be relatively small in the over-steer tendency wherein the braking force control of the front wheels is performed, so that it is possible to restrain the braking force control of the rear wheels. Moreover, it is possible to surely return the discriminating threshold εΔ from the second threshold εΔS to the first threshold εΔM, by the timer and the detection of the completion of the control in the over-steer tendency. In addition, it is possible to prevent surely the drift-out and spin of a vehicle by discriminating the turning direction of the vehicle on the basis of an actual yaw rate γ to surely discriminate as to whether the running condition of the vehicle is in the under-steer or over-steer tendency with respect to a target yaw rate γ' on the basis of the actual yaw rate γ and a yaw-rate difference Δγ to select the most suitable wheel to be braked from four wheels. That is, it is possible to prevent a vehicle from being easy to spin by applying braking force to a rear wheel in spite of the tendency toward spin, and to prevent a vehicle from being easy to drift out by applying braking force a front wheel in spite of the tendency toward drift-out. In addition, it is possible to prevent braking force from being applied to the wheel in the direction which is easy to spin during counter-steer.

According to the first preferred embodiment of the present invention, it is possible to accurately response parameters and target yaw rates for use in a braking force control which is combined with a 4WS, using a 4WS vehicle model, so that it is possible to obtain the target performance in the braking force control to perform a stable control.

Figure 10:
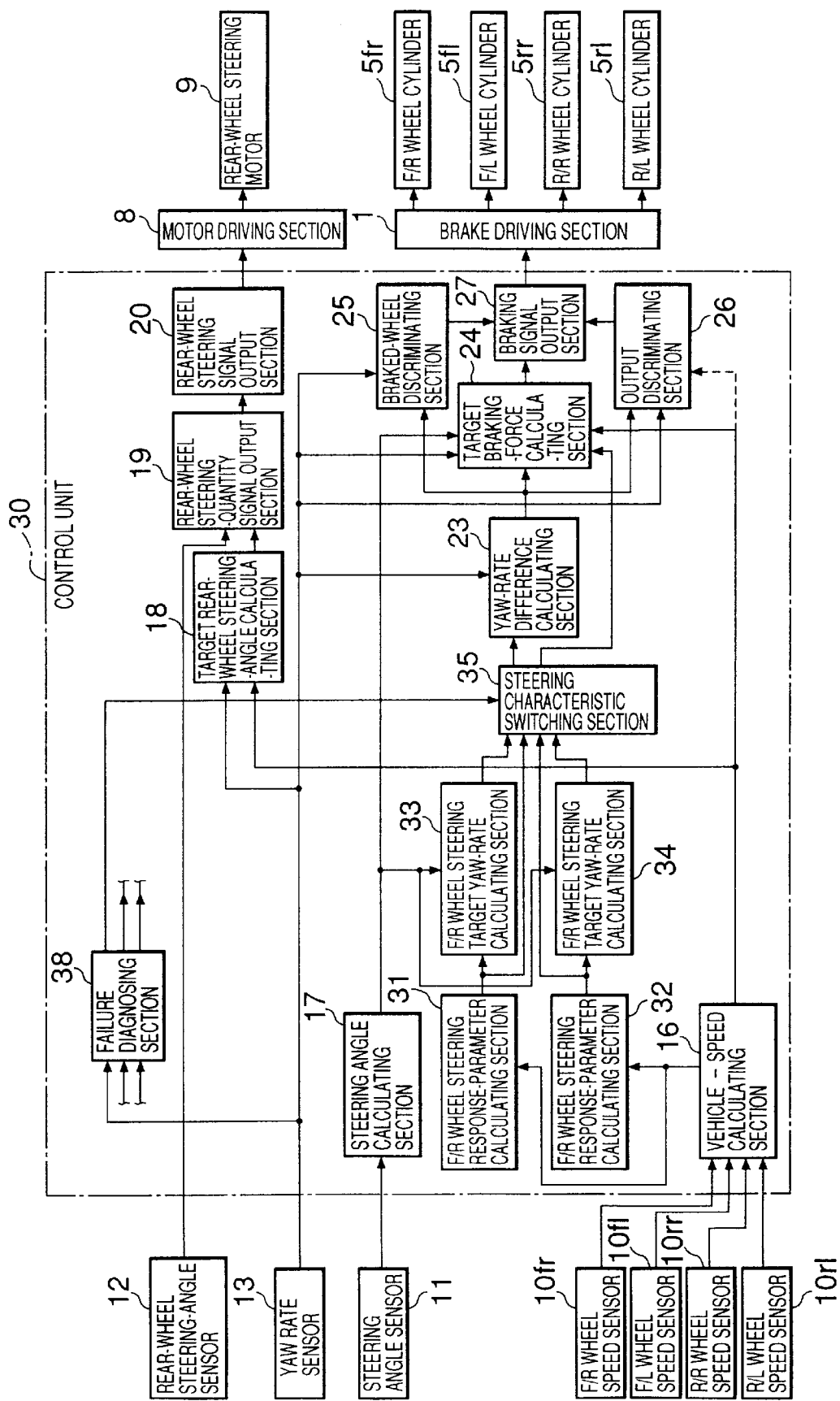
FIG. 10 is a functional block diagram of the second preferred embodiment of a vehicle motion control system according to the present invention.
Figure 11:
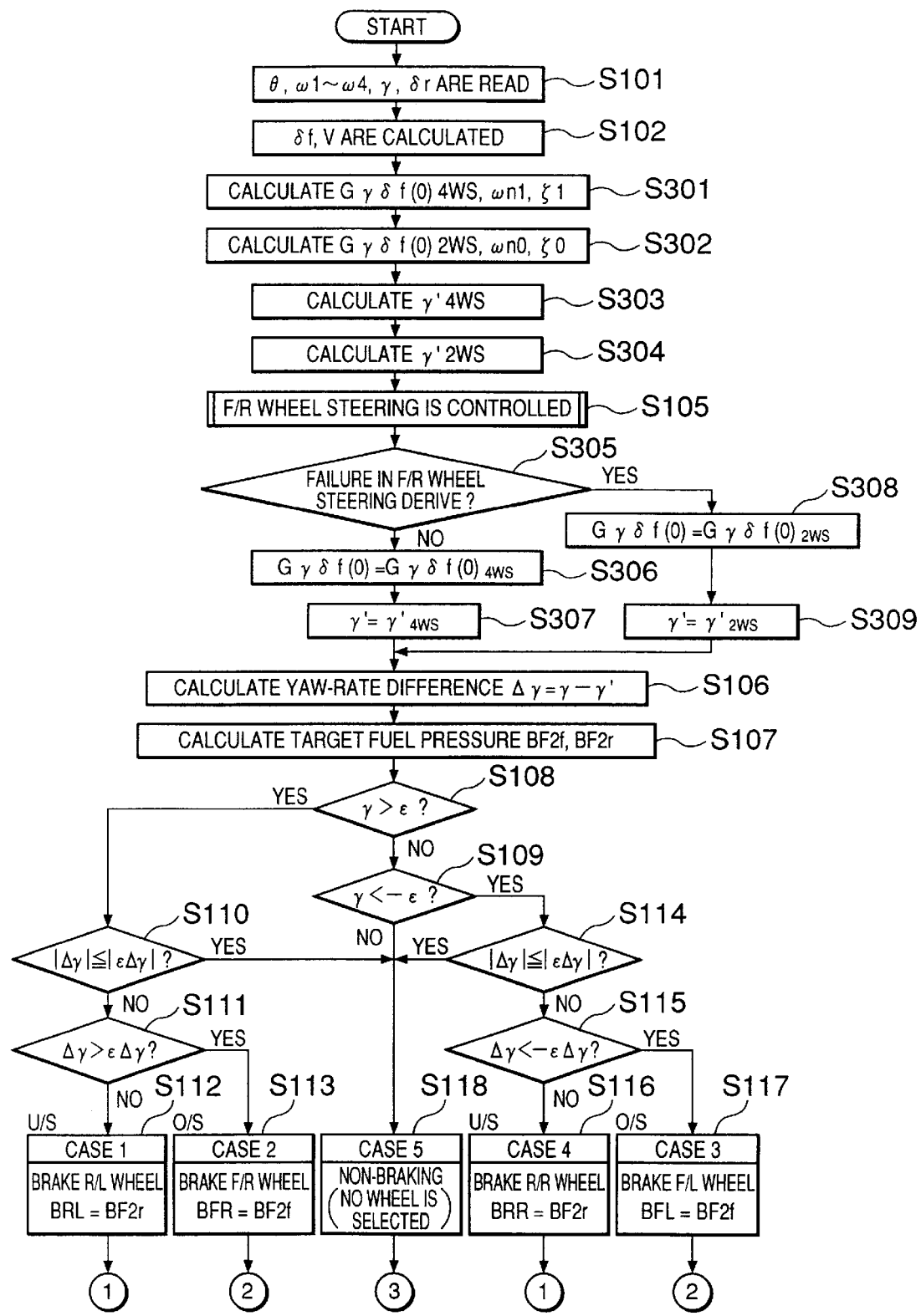
FIG. 11 is a flow chart of a vehicle motion control in the first preferred embodiment according to the present invention.
Figure 12:
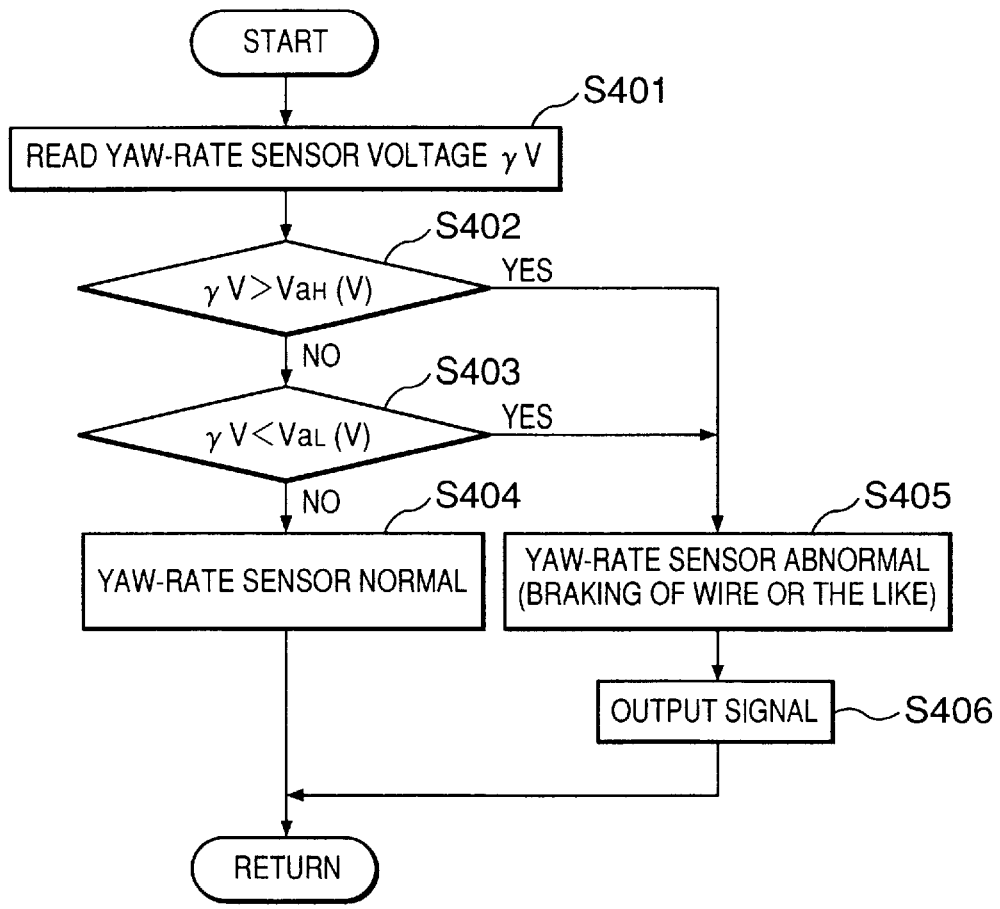
FIG. 12 is a flow chart of a failure diagnosis in the second preferred embodiment according to the present invention, in the case of a yaw rate sensor in an example.

FIGS. 10 through 12 illustrate the second preferred embodiment of a vehicle motion control system according to the present invention. Furthermore, in the second preferred embodiment of the present invention, when abnormality in the steering control is detected, the response parameters and target yaw rate, which have been derived in the 4WS vehicle model, are switched to those derived in the 2WS vehicle model.

As shown in FIG. 10, in the second preferred embodiment, a control unit 30 comprises a vehicle-speed calculating section 16, a steering-angle calculating section 17, a target rear-wheel steering-angle calculating section 18, a rear-wheel steering-quantity setting section 19, a rear-wheel steering signal output section 20, a front-and-rear wheel steering response-parameter calculating section 31, a front-wheel steering response-parameter calculating section 32, a front-and-rear wheel steering target yaw-rate calculating section 33, a front-wheel steering target yaw-rate calculating section 34, a steering characteristic switching section 35, a yaw-rate difference calculating section 23, a target braking-force calculating section 24, a braked-wheel discriminating section 25, an output discriminating section 26, a braking signal output section 27, and a failure diagnosing section.

The front-and-rear wheel steering response-parameter calculating section 31 performs the same calculations as those of the front-and-rear wheel steering response-parameter calculating section 21 in the first preferred embodiment, except that the front-and-rear wheel steering yaw-rate stationary gain Gγδf(0)4WS is outputted as it is (since Gγδf(0)4WS is outputted as Gγδf(0) in the front-and-rear wheel steering response-parameter calculating section 21, both are discriminated from another). That is, this front-and-rear wheel steering response-parameter calculating section 31 is provided for deriving a front-and-rear wheel steering yaw-rate stationary gain Gγδf(0)4WS, and a response natural frequency ωn1, a damping ratio ζ1 and so forth with respect to the steering of the 4WS vehicle model. The response parameters are outputted to the front-and-rear wheel steering target yaw-rate calculating section 33, and the front-and-rear wheel steering yaw-rate stationary gain Gγδf(0)4WS is outputted to the steering characteristic switching section 35.

The front-wheel steering response-parameter calculating section 32 derives a yaw rate stationary gain in a 2WS vehicle model on the basis of a preset formula (a front-wheel steering yaw-rate stationary gain Gγδf(0)2WS) and for response natural frequency ωn0, a damping ratio ζ0 and so forth with respect to the steering of the 2WS vehicle model. The response parameters are outputted to the front-wheel steering target yaw-rate calculating section 34, and the front-wheel steering yaw-rate stationary gain Gγδf(0)2WS is outputted to the steering characteristic switching section 35. The front-wheel steering yaw-rate stationary gain Gγδf(0)2WS is calculated by the following formula.

$$G\gamma\delta f(0)2WS=\{1/(1+A0\cdot V^2)\cdot(V/L)\} \quad (10)$$

Moreover, the front-and-rear wheel steering target yaw-rate calculating section 33 performs the same calculations as those of the front-and-rear wheel steering target yaw-rate calculating section 22 in the first preferred embodiment, except that the front-and-rear wheel steering target yaw rate γ'4WS is outputted as it is (since γ'4WS is outputted as γ in the front-and-rear wheel steering target yaw-rate calculating section 22, both are discriminated from another). That is, the front-and-rear wheel steering target yaw-rate calculating section 33 is provided for calculating a front-and-rear wheel steering target yaw rate γ'4WS in view of a response time lag of the vehicle on the basis of the front-wheel steering angle δf from the steering-angle calculating section 17, the respective response parameters Gγδf(0)4WS from the front-and-rear wheel steering response-parameter calculating section 31, ωn1, the damping ratio ζ1 and so forth, to output the calculated front-and-rear wheel steering target yaw rate γ'4WS to the steering characteristic switching section 35.

The front-wheel steering target yaw-rate calculating section 34 calculates a front-wheel steering target yaw rate γ'2WS in view of a response time lag of the vehicle on the basis of the front-wheel steering angle δf from the steering-angle calculating section 17, the respective response parameters Gγδf(0)2WS from the front-wheel steering response-parameter calculating section 32, ωn0, the damping ratio ζ0 and so forth, to output the calculated front-wheel steering target yaw rate γ'2WS to the steering characteristic switching section 35. The front-wheel steering target yaw rate γ'2WS is calculated by the following formula.

$$\gamma'2WS=G\gamma\delta f(0)2WS\cdot(1+T\cdot S)/\{(S^2/\omega n O^2)+(2\cdot\zeta 0\cdot S/\omega n 0)+1\}\cdot\delta f \quad (11)$$

The steering characteristic switching section 36 derives, as data, the front-and-rear wheel steering yaw-rate stationary gain Gγδf(0)4WS and the front-and-rear wheel steering target yaw rate γ'4WS, which have been calculated by the 4WS vehicle model, and the front-wheel steering yaw-rate stationary gain Gγδf(0)2WS and the front-wheel steering target yaw rate γ'2WS, which have been calculated by the 2WS vehicle model, to perform the switching between the data outputs of the 4WS vehicle model and the 2WS vehicle model on the basis of the signal outputted from the failure diagnosing section 36. That is, in a usual condition in which the failure diagnosing section 36 determines that the steering control is normally performed, the front-and-rear wheel steering yaw-rate stationary gain Gγδf(0)4WS and the front-and-rear wheel steering target yaw rate γ'4WS, which have been calculated by the 4WS vehicle model, are outputted as the yaw-rate stationary gain Gγδf(0) and the target yaw rate γ' of the vehicle. On the other hand, in a condition in which it determines that there is abnormality in the steering control, the front-wheel steering yaw-rate stationary gain Gγδf(0)2WS and the front-wheel steering target yaw rate γ'2WS, which have been calculated by the 2WS vehicle model, are outputted as the yaw-rate stationary gain Gγδf(0) and the target yaw rate γ' of the vehicle. The yaw-rate stationary gain Gγδf(0) outputted from the steering characteristic switching section 35 is outputted to the target braking-force calculating section 24, and the target yaw rate γ' is outputted to the yaw-rate difference calculating section 23. That is, in the 4WS control, when abnormality occurs in the sensor, the 4WS control section, the steering section and so forth, the rear-wheel steering angle is set to be return to the neutral position to be fixed thereto or to be fixed to the failure position, so as to prevent the setting of the rear-wheel steering angle from being interrupted, so that the steering characteristic becomes the 2WS vehicle model. Therefore, when abnormality occurs in the 4WS control, it is possible to effectively operate a stable braking-force control using the response parameters and the target yaw rate, which have been derived in the 2WS vehicle model, for the braking force control.

The steering characteristic switching section 35 is provided with a first order lag filter so as to switch the data with a response characteristic of first-order lag. In this case, the target yaw rate γ' when being switched is expressed by the following formula.

$$\gamma' = \gamma'4WS0 + (\gamma'2WS - \gamma'4WS0) \cdot \Delta t \cdot 2 \cdot \pi \cdot F \quad (12)$$

wherein γ'4WS0 is an output before one operation cycle, Δt is an operation period, and F is a filter frequency. Therefore, it is possible to smoothly perform the transition of the output when the data is switched to prevent the abrupt transition.

The failure diagnosing section 36 detects failures in the respective sensors, control sections and device sections of the vehicle. A portion of the failure diagnosing section 36, which relates to the failure diagnosis of the steering control. That is, the failure diagnosing section 36 has connections with the vehicle-speed sensors 10fl, 10fr, 10rl and 10rr, the steering-wheel angle sensor 11, the rear-wheel steering angle sensor 12, the yaw-rate sensor 13, various sensors (not shown), the target rear-wheel steering-angle calculating section 18, the rear-wheel steering-quantity setting section 19, the rear-wheel steering signal output section 20, the front-and-rear wheel steering response-parameter calculating section 31 and so forth, and a circuit section comprising the rear-wheel steering motor 9 and the others to detects the failure in the respective device sections. Among these elements, the failure diagnosing section 36 detects failure of the vehicle-speed sensor 10fl, 10fr, 10rl and 10rr, the rear-wheel steering sensor 12, the yaw rate sensor 13, the target rear-wheel steering-angle calculating section 18, the rear-wheel steering-quantity setting section 19, the rear-wheel steering signal output section 20, and the rear-wheel steering motor 9 as a failure of a steering control. A detection signal indicative of the failure in the steering control is outputted to the steering characteristic switching section 35, and also outputted to warning means (not shown) to perform a predetermined warning. In addition, the failure information is stored in a memory (not shown). Furthermore, in order to facilitate the explanation, FIG. 10 shows only the connection of the yaw rate sensor.

Referring to the flow chart of FIG. 11, a vehicle motion control in the second preferred embodiment of the present invention will be described below.

Furthermore, the flow chart of FIG. 11 corresponds to the flow chart of FIG. 4. This program is executed every predetermined time (for example, 10 ms) while the vehicle is running. After the program is started, at step 101, a steering-wheel angle θ, wheel speeds ω1, ω2, ω3 and ω4, an actual yaw rate γ and a rear-wheel steering angle δr are read out, and then, at step 102, a front-wheel steering angle δf and a vehicle speed V are calculated. Then, the routine goes to step 301.

At step 301, the front-and-rear wheel steering response-parameter calculating section 31 calculates various response parameters, i.e. a yaw-rate stationary gain Gγδf(0)4WS, ωn1 and ζ1, in the 4WS vehicle model. Then, the routine goes to step 302 wherein the front-wheel steering response-parameter calculating section 32 calculates the response parameters, i.e. Gγδf(0)2WS, ωn0 and ζ0, in the 2WS vehicle model. Then, the routine goes to step 303 wherein the front-and-rear steering target yaw-rate calculating section 33 calculates a target yaw rate γ'4WS in the 4WS vehicle model, and then, the routine goes to step 304 wherein the front-wheel steering target yaw-rate calculating section 34 calculates a target yaw rate γ'2. Then, the routine goes to step 105 wherein a rear-wheel steering signal is outputted in accordance with the front-and-rear wheel steering control routine which is the same as that of the first preferred embodiment.

Thereafter, when the routine goes to step 305, it is determined that there is failure in the front-and-rear wheel steering device (steering angle control). When there is no failure and it is normal, the routine goes to step 306 wherein Gγδf(0)4WS is set as the yaw-rate stationary gain Gγδf(0) in the response parameter of the vehicle (Gγδf(0)=Gγδf(0)4WS), and then, the routine goes to step 307 wherein γ'4WS is set as the target yaw rate γ' of the vehicle (γ'=γ'4WS). Then, the routine goes to step 106.

On the other hand, when it is determined at the step 305 that there is failure, the routine goes to step 308 wherein Gγδf(0)2WS is set as the yaw-rate stationary gain Gγδf(0) in the response parameter of the vehicle (Gγδf(0)=Gγδf(0)2WS), and then, the routine goes to step 309 wherein γ'2WS is set as the target yaw rate γ' of the vehicle (γ'=γ'2WS). Then, the routine goes to step 106. That is, the procedures in the steps 305 through 309 are performed in the steering characteristic switching section 35. After step 106, the same procedures as those of FIG. 4 are performed.

The failure diagnosing program executed by the failure diagnosing section 36 will be described using a failure diagnosis of the yaw rate sensor 13 as an example. This failure diagnosing program is an interruption routine. First, at step 401, an output voltage γV of the yaw rate sensor 13 is read, and the routine goes to step 402 wherein it is determined that the output voltage γV is greater than a voltage VaH. When the output voltage γV is not greater than the voltage VaH (γV≦VaH), the routine goes to step 403 wherein it is determined that the output voltage γV is less than a voltage VaL.

Then, when it is determined at step 403 that the output voltage γV is not less than the voltage VaL (γV≧VaL), the routine goes to step 404 wherein it is determined that the yaw rate sensor 13 is normal, and the failure diagnosis of the yaw rate sensor 13 is completed.

On the other hand, when it is determined at step 402 that the output voltage is greater than the voltage VaH (γV>VaH), or when it is determined at step 403 that the output voltage γV is less than the voltage VaL (γV<VaL), the routine goes to step 405 wherein it is determined that the yaw rate sensor 13 is abnormal. Then, the routine goes to step 406 wherein a signal is outputted to the steering characteristic switching section 35, the warning means and so forth, and then, the failure diagnosis of the yaw rate sensor 13 is completed.

That is, as shown in the characteristic drawing of FIG. 8, the measurable range of the yaw rate sensor 13 is VaH≧γV≧VaL, and it is neither γV>VaH nor γV<VaL in a normal condition, so that it is possible to determine that the yaw rate sensor 13 is abnormal when such a value is detected.

Furthermore, since other failure diagnoses than the failure diagnosis of the yaw rate sensor 13 are performed in the substantially same manner, the explanation thereof is omitted.

Thus, according to the second preferred embodiment of the present invention, when abnormality is detected in the 4WS control, the response parameters and the target yaw rates derived by the 4WS vehicle model are switched to those derived by the 2WS vehicle model. Therefore, even if abnormality occurs in the 4WS control, it is possible to effectively operate a stable braking force control by the 2WS control.

Furthermore, while the front-and-rear wheel steering-angle control, i.e. the 4WS control, for the yaw-rate proportional rear-wheel steering-angle control has been described in the preferred embodiments, the present invention should not be limited thereto, and may be applied to other 4WS controls (for example, front-wheel steering-force proportional, front-wheel steering-angle proportional controls).

While the presently preferred embodiments of the present invention have been shown and described, it is to be understood that the disclosures are for the purpose of illustration and that various changes and modification may be made without departing from the scope of the invention as set forth in the appended claims.

What is claimed is:

1. A vehicle motion control system having vehicle-speed detecting means, responsive to signals from each left and right front wheel speed sensors and each left and right rear wheel speed sensors mounted on a vehicle, for detecting a running speed of the vehicle and for producing a vehicle speed signal indicative thereof, front-wheel steering-angel detecting means, provided near a steering wheel, for detecting a steering angle of a front wheel of the vehicle and for generating a front-wheel-steering-angle signal indicative thereof, rear-wheel steering-angle detecting means, provided near rear wheels, for detecting a rear-wheel steering angle of the vehicle and for producing a detected rear-wheel-steering-angle signal indicative thereof, and actual yaw-rate detecting means for detecting an actual yaw rate of the vehicle and for producing an actual yaw-rate signal indicative thereof, comprising:

target rear-wheel steering-angle calculating means, responsive to said actual yaw-rate signal and said vehicle speed signal, for calculating a target rear-wheel steering angle and for producing a target rear-wheel-steering-angle signal indicative thereof;

rear-wheel steering quantity signal output means, responsive to said detected rear-wheel-steering-angle signal and said target rear-wheel-steering-angle signal, for outputting the steering quantity of rear wheels;

front-and-rear wheel steering response-parameter calculating means, responsive to said vehicle speed signal, for calculating a front-and-rear wheel steering response parameter in accordance with a front-and-rear wheel steering vehicle model on the basis of the running speed of the vehicle and for generating a parameter signal indicative thereof;

front-and-rear wheel steering target yaw-rate calculating means, responsive to said parameter signal and said front-wheel-steering-angle signal, for calculating a front-and-rear wheel steering target yaw rate on the basis of the parameter signal and the front-wheel-steering-angle signal and for producing a target yaw-rate signal indicative thereof;

yaw-rate difference calculating means, responsive to said target yaw-rate signal and said actual yaw-rate signal, for calculating a yaw rate difference between the front-and-rear wheel steering target yaw rate and the actual yaw rate, and for generating a difference signal indicative thereof;

target braking-force calculating means, responsive to said difference signal, said front-wheel-steering-angle signal, said actual yaw-rate signal, said parameter signal and said vehicle speed signal, for calculating a target braking force of said vehicle on the basis of an operating condition of vehicle motion, and for producing a target braking-force signal indicative thereof;

braked-wheel discriminating means, responsive to said actual yaw-rate signal and said difference signal, for selecting either one of a rear-inside wheel or a front-outside wheel to be braked in accordance with said actual yaw rate signal, and for producing a brake signal indicative thereof;

output discriminating means, responsive to said actual yaw-rate signal and said difference signal, for judging whether or not the vehicle is operating within a braking controllable region, and for producing a judgement signal indicative thereof; and braking-signal output means, responsive to said judgement signal, said brake signal, and said target braking force signal, for controlling a braking force to each wheel selected by the braked-wheel discriminating means in accordance with said target braking force when said output discriminating means determines that said vehicle is operating within the braking controllable region.

2. A vehicle motion control system having vehicle-speed detecting means, responsive to signals from each left and right front wheel speed sensors and each left and right rear wheel speed sensors mounted on a vehicle, for detecting a running speed of the vehicle and for producing a vehicle speed signal indicative thereof, front-wheel steering-angle detecting means, provided near a steering wheel, for detecting a steering angle of a front wheel of the vehicle and for generating a front-wheel-steering-angle signal indicative thereof, rear-wheel steering-angle detecting means, provided near rear wheels, for detecting a rear-wheel steering angle of the vehicle and for producing a detected rear-wheel-steering-angle signal indicative thereof, and actual yaw-rate detecting means for detecting an actual yaw rate of the vehicle and for producing an actual yaw-rate signal indicative thereof, comprising:

target rear-wheel steering-angle calculating means, responsive to said actual yaw-rate signal and said vehicle speed signal, for calculating a target rear-wheel steering angle and for producing a target rear-wheel-steering-angle signal indicative thereof;

rear-wheel steering quantity signal output means, responsive to said detected rear-wheel-steering-angle signal and said target rear-wheel-steering-angle signal, for outputting the steering quantity of rear wheels;

front-and-rear wheel steering response-parameter calculating means, responsive to said vehicle speed signal, for calculating a front-and-rear wheel steering response parameter in accordance with a front-and-rear wheel steering vehicle model on the basis of the running speed of the vehicle and for generating a first parameter signal indicative thereof;

front-wheel steering response-parameter calculating means, responsive to said vehicle speed signal, for calculating a front-wheel steering response parameter in accordance with a front-wheel steering vehicle model on the basis of the running speed of the vehicle and for generating a second parameter signal;

front-and-rear wheel steering target yaw-rate calculating means, responsive to said first parameter signal and said front-wheel-steering-angle signal, for calculating a front-and-rear wheel steering target yaw rate on the basis of the first parameter signal and the front-wheel-steering-angle signal and for producing a first target yaw-rate signal indicative thereof;

front-wheel steering target yaw-rate calculating means, responsive to said second parameter signal and said front-wheel-steering-angle signal, for calculating a front-wheel steering target yaw-rate on the basis of the second parameter signal and the front-wheel-steering-angle signal and for producing a second target yaw-rate signal;

steering-angle control failure diagnosing means for detecting abnormality in a steering angle control;

steering characteristic switching means for outputting the front-and-rear wheel steering response parameter as a response parameter and the first target yaw-rate signal as an outputted target yaw rate signal in a usual condition, and for outputting the front-wheel steering response parameter and the second target yaw-rate signal as the outputted target yaw rate signal when the steering-angle control failure diagnosing means detects abnormality in the steering angle control;

yaw-rate difference calculating means, responsive to said outputted target yaw-rate signal and said actual yaw-rate signal, for calculating a yaw rate difference between the outputted target yaw rate and the actual yaw rate, and for generating a difference signal indicative thereof;

target braking-force calculating means, responsive to said difference signal, said front-wheel-steering-angle signal, said actual yaw-rate signal, said parameter signal and said vehicle speed signal, for calculating a target braking force of said vehicle on the basis of an operating condition of vehicle motion, and for producing a target braking-force signal indicative thereof;

braked-wheel discriminating means, responsive to said actual yaw-rate signal and said difference signal, for selecting either one of a rear-inside wheel or a front-outside wheel to be braked in accordance with said actual yaw rate signal, and for producing a brake signal indicative thereof;

output discriminating means, responsive to said actual yaw-rate signal and said difference signal, for judging whether or not the vehicle is operating within a braking controllable region and for producing a judgement signal indicative thereof; and braking-signal output means, responsive to said judgement signal, said brake signal, and said target braking-force signal, for controlling a braking force to each wheel selected by the braked-wheel discriminating means in accordance with said target braking force when said output discriminating means determines that said vehicle is operating within the braking controllable region.

3. A vehicle motion control system as set forth in claim 2, wherein said steering characteristic switching means outputs the front-wheel steering response parameter as the response parameter and the second target yaw rate signal as the outputted target yaw rate signal in a predetermined response characteristic, when the outputs of the response parameter and the outputted target yaw rate are changed to those of the front-wheel steering response parameter and the front-wheel steering target yaw rate.

* * * * *